United States Patent
Austrheim

(10) Patent No.: US 11,685,391 B2
(45) Date of Patent: Jun. 27, 2023

(54) AUTOMATED STORAGE AND RETRIEVAL SYSTEM AND A METHOD OF TRANSPORTING STORAGE CONTAINERS BETWEEN AN AUTOMATED STORAGE AND RETRIEVAL GRID AND A SECOND LOCATION

(71) Applicant: Autostore Technology AS, Nedre Vats (NO)

(72) Inventor: Trond Austrheim, Etne (NO)

(73) Assignee: Autostore Technology AS, Nedre Vats (NO)

( * ) Notice: Subject to any disclaimer, the term of this patent is extended or adjusted under 35 U.S.C. 154(b) by 81 days.

(21) Appl. No.: 16/972,416

(22) PCT Filed: Jun. 11, 2019

(86) PCT No.: PCT/EP2019/065166
§ 371 (c)(1),
(2) Date: Dec. 4, 2020

(87) PCT Pub. No.: WO2019/238652
PCT Pub. Date: Dec. 19, 2019

(65) Prior Publication Data
US 2021/0229916 A1    Jul. 29, 2021

(30) Foreign Application Priority Data

Jun. 12, 2018 (NO) .................................... 20180813
Jul. 19, 2018 (NO) .................................... 20181005

(51) Int. Cl.
*B65G 1/04* (2006.01)
*B60W 50/00* (2006.01)
(Continued)

(52) U.S. Cl.
CPC ......... *B60W 50/0098* (2013.01); *B61B 13/00* (2013.01); *B65G 1/0414* (2013.01);
(Continued)

(58) Field of Classification Search
CPC ........................... B65G 1/0464; B65G 1/0478
See application file for complete search history.

(56) References Cited

U.S. PATENT DOCUMENTS 3,519,150 A    7/1970   Keena et al.
3,800,963 A    4/1974   Holland
(Continued)

FOREIGN PATENT DOCUMENTS

CA    2988122 A1    12/2016
CN    1980843 A    6/2007
(Continued)

OTHER PUBLICATIONS

Office Action issued in counterpart Chinese Application No. 201980038796.0 dated Sep. 30, 2021 (17 pages).
(Continued)

*Primary Examiner* — Jonathan Snelting
(74) *Attorney, Agent, or Firm* — Osha Bergman Watanabe & Burton LLP

(57) ABSTRACT

An automated storage and retrieval system comprising an automated storage and retrieval grid and a delivery system. The automated storage and retrieval grid includes a container handling vehicle rail system for guiding a plurality of container handling vehicles and a delivery column adapted for transport of a storage container arranged in a stack of storage containers beneath the container handling vehicle rail system between a container handling vehicle and a delivery port situated at a lower end of the delivery column. The container handling vehicle rail system includes a first set of parallel rails arranged in a horizontal plane and
(Continued)

extending in a first direction, and a second set of parallel rails arranged in the horizontal plane and extending in a second direction which is orthogonal to the first direction, which first and second sets of rails form a grid pattern in the horizontal plane including a plurality of adjacent container handling vehicle grid cells. Each container handling vehicle grid cell includes a container handling vehicle grid opening defined by a pair of neighboring rails of the first set of rails and a pair of neighboring rails of the second set of rails. The delivery system includes a remotely operated delivery vehicle including a container carrier adapted to support the storage container. The delivery vehicle is further adapted to transport the storage container between the delivery port and a second location for handling of the storage container by at least one of a robotic operator and a human operator.

8 Claims, 13 Drawing Sheets

(51) Int. Cl.

| | | |
|---|---|---|
| G05D 1/00 | (2006.01) | |
| B65G 1/06 | (2006.01) | |
| B66F 9/19 | (2006.01) | |
| B65G 1/137 | (2006.01) | |
| B65G 47/06 | (2006.01) | |
| B65G 47/52 | (2006.01) | |
| B65G 57/03 | (2006.01) | |
| B65G 63/06 | (2006.01) | |
| B65G 65/23 | (2006.01) | |
| B66F 9/06 | (2006.01) | |
| G05D 1/02 | (2020.01) | |
| B61B 13/00 | (2006.01) | |
| B65G 67/24 | (2006.01) | |
| B65G 43/00 | (2006.01) | |
| B65G 63/00 | (2006.01) | |

(52) U.S. Cl.
CPC ......... *B65G 1/0457* (2013.01); *B65G 1/0464* (2013.01); *B65G 1/0471* (2013.01); *B65G 1/0478* (2013.01); *B65G 1/0485* (2013.01); *B65G 1/0492* (2013.01); *B65G 1/065* (2013.01); *B65G 1/1375* (2013.01); *B65G 43/00* (2013.01); *B65G 47/06* (2013.01); *B65G 47/52* (2013.01); *B65G 57/03* (2013.01); *B65G 63/06* (2013.01); *B65G 65/23* (2013.01); *B65G 67/24* (2013.01); *B66F 9/063* (2013.01); *B66F 9/19* (2013.01); *G05D 1/0011* (2013.01); *G05D 1/021* (2013.01); *G05D 1/0291* (2013.01); *B60W 2710/06* (2013.01); *B60W 2720/10* (2013.01); *B60W 2720/24* (2013.01); *B65G 1/1378* (2013.01); *B65G 63/004* (2013.01); *B65G 2201/0235* (2013.01); *B65G 2201/0258* (2013.01); *B65G 2203/0283* (2013.01); *B65G 2203/042* (2013.01); *G05D 1/02* (2013.01); *G05D 1/0229* (2013.01); *G05D 1/0231* (2013.01); *G05D 1/0259* (2013.01); *G05D 1/0289* (2013.01); *G05D 2201/0216* (2013.01)

(56) References Cited

U.S. PATENT DOCUMENTS

| | | | |
|---|---|---|---|
| 4,088,232 A * | 5/1978 | Lilly | B65G 1/0464 |
| | | | 414/282 |
| 4,538,950 A | 9/1985 | Shiomi et al. | |
| 4,909,697 A | 3/1990 | Bernard, II et al. | |
| 5,538,809 A | 7/1996 | Bittihn et al. | |
| 7,101,139 B1 | 9/2006 | Benedict | |
| 8,628,289 B1 | 1/2014 | Benedict et al. | |
| 9,527,669 B1 | 12/2016 | Hanssen et al. | |
| 10,189,641 B2 * | 1/2019 | Hognaland | B65G 1/06 |
| 11,072,494 B2 * | 7/2021 | Hognaland | B65G 1/0464 |
| 2003/0093176 A1 | 5/2003 | Ohtsuka et al. | |
| 2005/0047895 A1 | 3/2005 | Lert | |
| 2008/0269960 A1 | 10/2008 | Kostmann | |
| 2011/0027059 A1 | 2/2011 | Benedict et al. | |
| 2012/0282068 A1 | 11/2012 | Tschurwald et al. | |
| 2014/0086714 A1 | 3/2014 | Malik | |
| 2014/0277693 A1 | 9/2014 | Naylor | |
| 2014/0288696 A1 | 9/2014 | Lert | |
| 2014/0031185 A1 | 10/2014 | Keating et al. | |
| 2014/0292274 A1 | 10/2014 | Dorval et al. | |
| 2016/0060037 A1 | 3/2016 | Razumov | |
| 2016/0176638 A1 | 6/2016 | Toebes | |
| 2016/0272421 A1 * | 9/2016 | Hognaland | B65G 1/0478 |
| 2016/0325932 A1 | 11/2016 | Hognaland | |
| 2017/0057745 A1 | 3/2017 | Ueda et al. | |
| 2017/0129702 A1 * | 5/2017 | Hognaland | B65G 1/0464 |
| 2017/0166400 A1 | 6/2017 | Hofmann | |
| 2018/0044110 A1 | 2/2018 | Clarke et al. | |
| 2018/0065804 A1 | 3/2018 | Hognaland | |
| 2018/0068253 A1 | 3/2018 | Simms et al. | |
| 2018/0082162 A1 | 3/2018 | Durham et al. | |
| 2018/0118078 A1 | 5/2018 | Alkhaldi et al. | |
| 2018/0141754 A1 | 5/2018 | Garrett et al. | |
| 2018/0150793 A1 | 5/2018 | Lert, Jr. et al. | |
| 2020/0148474 A1 | 5/2020 | Salichs et al. | |

FOREIGN PATENT DOCUMENTS

| | | |
|---|---|---|
| CN | 101553416 A | 10/2009 |
| CN | 101711210 A | 5/2010 |
| CN | 102050333 A | 5/2011 |
| CN | 102992012 A | 3/2013 |
| CN | 103399574 A | 11/2013 |
| CN | 104066661 A | 9/2014 |
| CN | 104781163 A | 7/2015 |
| CN | 104885106 A | 9/2015 |
| CN | 105383848 A | 3/2016 |
| CN | 105517923 A | 4/2016 |
| CN | 105899398 A | 8/2016 |
| CN | 105947514 A | 9/2016 |
| CN | 106064718 A | 11/2016 |
| CN | 106241154 A | 12/2016 |
| CN | 106414278 A | 2/2017 |
| CN | 106575391 A | 4/2017 |
| CN | 106660703 A | 5/2017 |
| CN | 106662874 A | 5/2017 |
| CN | 106829298 A | 6/2017 |
| CN | 206750711 U | 12/2017 |
| CN | 206790852 U | 12/2017 |
| CN | 107922119 A | 4/2018 |
| CN | 108137229 A | 6/2018 |
| CN | 108140168 A | 6/2018 |
| DE | 40 16 810 C1 | 11/1991 |
| DE | 9310690 U1 | 9/1993 |
| DE | 102009017241 A1 | 10/2010 |
| EP | 0458021 A1 | 11/1991 |
| EP | 2881905 A1 | 6/2015 |
| EP | 3003932 A1 | 4/2016 |
| GB | 1 267 751 A | 3/1972 |
| GB | 1276160 A | 6/1972 |
| GB | 2211822 A | 7/1989 |
| GB | 2233319 A | 1/1991 |
| JP | S6417707 A | 1/1989 |
| JP | H09-152914 A | 6/1997 |
| JP | 2017088404 A | 5/2017 |
| KR | 20170026074 A | 3/2017 |
| NO | 317366 B1 | 10/2004 |
| RU | 2008111257 A | 10/2009 |
| WO | 96/14258 A1 | 5/1996 |
| WO | 2005/077789 A1 | 8/2005 |
| WO | 2011/002478 A2 | 1/2011 |
| WO | 2012/106746 A1 | 8/2012 |

(56) References Cited

FOREIGN PATENT DOCUMENTS

| | | |
|---|---|---|
| WO | 2014/075937 A1 | 5/2014 |
| WO | 2014/090684 A1 | 6/2014 |
| WO | 2014/195901 A1 | 12/2014 |
| WO | 2015/084236 A1 | 6/2015 |
| WO | 2015/140216 A1 | 9/2015 |
| WO | 2015/185628 A2 | 12/2015 |
| WO | 2015/193278 A1 | 12/2015 |
| WO | 2016/120075 A1 | 8/2016 |
| WO | 2016/166294 A1 | 10/2016 |
| WO | 2016/166323 A1 | 10/2016 |
| WO | 2016/196815 A1 | 12/2016 |
| WO | 2016/198467 A1 | 12/2016 |
| WO | 2017/037095 A1 | 3/2017 |
| WO | 2017/081281 A1 | 5/2017 |
| WO | 2017081273 A1 | 5/2017 |
| WO | 2017/121512 A1 | 7/2017 |
| WO | 2017/121515 A1 | 7/2017 |
| WO | 2017/153563 A1 | 9/2017 |
| WO | 2017/211640 A1 | 12/2017 |
| WO | 2017/220651 A1 | 12/2017 |
| WO | 2018/082972 A1 | 5/2018 |
| WO | 2018/162757 A1 | 9/2018 |

OTHER PUBLICATIONS

Search Report issued in counterpart Chinese Application No. 201980038796.0 dated Sep. 30, 2021 (3 pages).
Office Action issued in counterpart Chinese Application No. 201980039066.2 dated Sep. 10, 2021 (10 pages).
Search Report issued in counterpart Chinese Application No. 201980039066.2 dated Sep. 6, 2021 (3 pages).
Extended European Search Report issued in Application No. 21186410.3 dated Nov. 25, 2021.
Norwegian Search Report issued in No. 20181005 dated Feb. 6, 2019 (2 pages).
International Search Report issued in International Application No. PCT/EP2019/065166, dated Sep. 12, 2019 (7 pages).
Written Opinion issued in International Application No. PCT/EP2019/065166; dated Sep. 12, 2019 (6 pages).
International Preliminary Report on Patentability issued in International Application No. PCT/EP2019/065166; dated Sep. 7, 2020 (15 pages).
Office Action in counterpart Chinese Patent Application No. 201980038106.1 dated Sep. 8, 2021 (6 pages).
Office Action issued in Chinese Application No. 201980037162.3; dated Sep. 27, 2021 (8 pages).
Office Action in counterpart Chinese Patent Application No. 201980039028.7 dated Oct. 27, 2021 (15 pages).
Office Action in counterpart Chinese Patent Application No. 201980039068.1 dated Sep. 15, 2021 (23 pages).
Office Action issued in Chinese Application No. 2019800388569 dated Oct. 19, 2021 (16 pages).
Office Action issued in Chinese Application No. 201980039046.5 dated Sep. 15, 2021 (18 pages).
Office Action issued in the counterpart Chinese Patent Application No. 201980037723X, dated Sep. 17, 2021 (25 pages).
Office Action issued in the counterpart Chinese Patent Application No. 2019800383353, dated Dec. 17, 2021 (3 pages).
Office Action in counterpart Chinese Patent Application No. 2019800538763 dated Dec. 6, 2021 (13 pages).
Office Action in counterpart Chinese Patent Application No. 2019800393798 dated Dec. 9, 2021 (17 pages).
United States Office Action in related U.S. Appl. No. 16/972,482, dated Mar. 22, 2022 (46 pages).

* cited by examiner

A

B

AUTOMATED STORAGE AND RETRIEVAL SYSTEM AND A METHOD OF TRANSPORTING STORAGE CONTAINERS BETWEEN AN AUTOMATED STORAGE AND RETRIEVAL GRID AND A SECOND LOCATION

The invention is related to an automated storage and retrieval system comprising an automated storage and retrieval grid and a delivery system.

The delivery system comprises a remotely operated delivery vehicle comprising a container carrier adapted to support a storage container. The delivery vehicle being further adapted to transport the storage container between the delivery port of the storage grid and a second location for handling of the storage container by at least one of a robotic operator and a human operator.

BACKGROUND AND PRIOR ART

FIGS. 1A and 1C disclose a typical prior art automated storage and retrieval system 1 with a framework structure 100. FIGS. 1B and 1D disclose a prior art container handling vehicle 101 operating the system 1 disclosed in FIGS. 1A and 1C, respectively.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107.

Each storage container 106 may typically hold a plurality of product items (not shown), and the product items within a storage container 106 may be identical or may be of different product types depending on the application.

The storage grid 104 guards against horizontal movement of the storage containers 106 in the stacks 107, and guides vertical movement of the storage containers 106, but does normally not otherwise support the storage containers 106 when stacked.

The automated storage and retrieval system 1 comprises a container handling vehicle rail system 108 arranged in a grid pattern across the top of the storage 104, on which rail system 108 a plurality of container handling vehicles 200, 300 (as exemplified in FIGS. 1B and 1D) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 1C marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines grid columns above which the container handling vehicles 200,300 can move laterally above the storage columns 105, i.e. in a plane which is parallel to the horizontal X-Y plane.

Each prior art container handling vehicle 200,300 comprises a vehicle body and a wheel arrangement of eight wheels 201,301 where a first set of four wheels enable the lateral movement of the container handling vehicles 200,300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the exemplary prior art grid 104 disclosed in FIGS. 1A and 1C, Z=8 identifies the lowermost, bottom layer of the grid 104. Consequently, as an example, and using the Cartesian coordinate system X, Y, Z indicated in FIGS. 1A and 1D, the storage container identified as 106' in FIG. 1A can be said to occupy grid location or cell X=10, Y=2, Z=3. The container handling vehicles 101 can be said to travel in layer Z=0 and each grid column can be identified by its X and Y coordinates.

Each container handling vehicle 200 comprises a storage compartment or space (not shown) for receiving and stowing a storage container 106 when transporting the storage container 106 across the rail system 108. The storage space may comprise a cavity centrally arranged within the vehicle body, e.g. as is described in WO2014/090684A1, the contents of which are incorporated herein by reference.

Alternatively, the container handling vehicles 300 may have a cantilever construction, as is described in NO317366, the contents of which are also incorporated herein by reference.

The container handling vehicles 200 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles 200 may have a footprint which is larger than the lateral extent of (lateral area defined by) a grid column 105, e.g. as is disclosed in WO2014/090684A1.

The rail system 108 may be a single track system, as is shown in FIG. 2A. Alternatively, the rail system 108 may be a double track system, as is shown in FIG. 2B, thus allowing a container handling vehicle 201 having a footprint 202,202' generally corresponding to the lateral area defined by a grid column 112 to travel along a row of grid columns even if another container handling vehicle 200 is positioned above a grid column neighboring that row. Both the single and double track system, or a combination comprising a single and double track arrangement in a single rail system 108, forms a grid pattern in the horizontal plane P comprising a plurality of rectangular and uniform grid locations or grid cells 122, where each grid cell 122 comprises a grid opening 115 being delimited by a pair of rails 110a,110b of the first rails 110 and a pair of rails 111a,111b of the second set of rails 111. In FIG. 2B the grid cell 122 is indicated by a dashed box.

Consequently, rails 110a and 110b form pairs of neighboring rails defining parallel rows of grid cells running in the X direction, and rails 111a and 111b form pairs of neighboring rails defining parallel rows of grid cells running in the Y direction.

As shown in FIG. 2C, each grid cell 122 has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

In the X and Y directions, neighboring grid cells 122 are arranged in contact with each other such that there is no space there-between.

In a storage grid 104, a majority of the grid columns are storage columns 105, i.e. grid columns 105 where storage containers 106 are stored in stacks 107. However, a grid 104 normally has at least one grid column which is used not for storing storage containers 106, but which comprises a location where the container handling vehicles 200,300 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column in which the port is located may be referred to as a "delivery column" 119,120. The drop-off and pick-up ports of the container handling vehicles are referred to as the "upper ports of a delivery column" 119,120. While the opposite end of the delivery column is referred to as the "lower ports of a delivery column".

The storage grids 104 in FIGS. 1A and 1C comprise two delivery columns 119 and 120. The first delivery column 119 may for example comprise a dedicated drop-off port where the container handling vehicles 200,300 can drop off storage containers 106 to be transported through the delivery column 119 and further to an access or a transfer station (not shown), and the second delivery column 120 may comprise a dedicated pick-up port where the container handling vehicles 200,300 can pick up storage containers 106 that have been transported through the delivery column 120 from an access or a transfer station (not shown). Each of the ports of the first and second delivery column 119,120 may comprise a port suitable for both pick up and drop of storage containers 106.

The second location may typically be a picking or a stocking station where product items are removed from or positioned into the storage containers 106. In a picking or a stocking station, the storage containers 106 are normally never removed from the automated storage and retrieval system 1 but are returned into the storage grid 104 once accessed. For transfer of storage containers out or into the storage grid 104, there are also lower ports provided in a delivery column, such lower ports are e.g. for transferring storage containers 106 to another storage facility (e.g. to another storage grid), directly to a transport vehicle (e.g. a train or a lorry), or to a production facility.

For monitoring and controlling the automated storage and retrieval system 1 (e.g. monitoring and controlling the location of respective storage containers 106 within the storage grid 104; the content of each storage container 106; and the movement of the container handling vehicles 200, 300 so that a desired storage container 106 can be delivered to the desired location at the desired time without the container handling vehicles 200,300 colliding with each other), the automated storage and retrieval system 1 comprises a control system (not shown) which typically is computerized and which typically comprises a database for keeping track of the storage containers 106.

A conveyor system comprising conveyors may be employed to transport the storage containers between the lower port of the delivery column 119,120 and the access station.

If the lower port of the delivery column 119,120 and the access station are located at different levels, the conveyor system may comprise a lift device for transporting the storage containers 106 vertically between the port and the access station.

The conveyor system may be arranged to transfer storage containers between different grids, e.g. as is described in WO2014/075937A1, the contents of which are incorporated herein by reference.

Further, WO2016/198467A1, the contents of which are incorporated herein by reference, disclose an example of a prior art access system having conveyor belts (FIGS. 5a and 5b in WO2016/198467A1) and a frame mounted rail (FIGS. 6a and 6b in WO016/198467A1) for transporting storage containers between delivery columns and work stations where operators can access the storage containers.

When a storage container 106 stored in the grid 104 disclosed in FIG. 1A is to be accessed, one of the container handling vehicles 200,300 is instructed to retrieve the target storage container 106 from its position in the grid 104 and to transport it to or through the delivery column 119. This operation involves moving the container handling vehicle 200,300 to a grid location above the storage column 105 in which the target storage container 106 is positioned, retrieving the storage container 106 from the storage column 105 using the container handling vehicle's lifting device (not shown), and transporting the storage container 106 to the delivery column 119. If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200,300 that is subsequently used for transporting the target storage container 106 to the delivery column, or with one or a plurality of other cooperating container handling vehicles 200,300. Alternatively, or in addition, the automated storage and retrieval system 1 may have container handling vehicles 200,300 specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 200,300 is instructed to pick up the storage container 106 from the delivery column 120 and to transport it to a grid location above the storage column 105 where it is to be stored. After any storage containers positioned at or above the target position within the storage column stack 107 have been removed, the container handling vehicle 200,300 positions the storage container 106 at the desired position. The removed storage containers may then be lowered back into the storage column 105 or relocated to other storage columns 105.

A problem associated with known automated storage and retrieval systems 1 is that the area surrounding the pick-up and drop-off ports may become congested with container handling vehicles 200,300 instructed to drop off or pick up storage containers 106. This may seriously impede the operation of the automated storage and retrieval system 1. In small systems this situation may possibly be alleviated by adding delivery columns to the grid, as this will allow the container handling vehicles 200,300 to be distributed among a larger number of ports of delivery columns in order to avoid congestion. However, if ports and columns are added, the conveyor system infrastructure must normally be increased. This requires space, which may not necessarily be available. Also, adding conveyor system infrastructure is costly.

Another problem with prior art automated storage and retrieval systems 1 is that the separate drop-off ports and pick-up ports of the delivery columns 119,120 require the container handling vehicles 200,300 to move to a storage column 105 after drop-off to retrieve a new storage container 106. Likewise, the container handling vehicles 200,300 have to be empty of a storage container 106 when they are sent to a pick-up port 120 to pick up a storage container. This results in an inefficiency and causes increased congestion around the ports, as container handling vehicles 200,300 are moving around on the grid without a storage container 106 as payload. In addition, the delivery columns 119,120 may take up space on the grid 104 which could be used for other purposes such as the movement of container handling vehicles 200,300.

In view of the above, it is desirable to provide an automated storage and retrieval system, and a method for operating such a system, that solve or at least mitigate one or more of the aforementioned problem related to use of prior art storage and retrieval systems.

An objective of the invention is to provide an automated storage and retrieval system which is more effective than prior art systems by avoiding or at least reducing congestion of storage containers around the delivery column.

Another objective is to provide an automated storage and retrieval system that increases the availability of a delivery column for container handling vehicles operating on a rail system.

Yet another objective is to provide a high efficiency automated storage and retrieval system which are easy to install, and which delivery capacity can easily be increased after completed installation.

Yet another objective is to provide an automated storage and retrieval system which increases the efficiency and facilitates the operation of storing and retrieving items within storage containers.

SUMMARY OF THE INVENTION

The invention is set forth in the independent claims and the dependent claims describe alternatives of the invention.

The invention is related to an automated storage and retrieval system comprising an automated storage and retrieval grid and a delivery system.

The automated storage and retrieval grid comprises:
- a container handling vehicle rail system for guiding a plurality of container handling vehicles, the container handling vehicle rail system comprising a first set of parallel rails arranged in a horizontal plane (P) and extending in a first direction (X), and a second set of parallel rails arranged in the horizontal plane (P) and extending in a second direction (Y) which is orthogonal to the first direction (X), which first and second sets of rails form a grid pattern in the horizontal plane (P) comprising a plurality of adjacent container handling vehicle grid cells, each container handling vehicle grid cell comprising a container handling vehicle grid opening defined by a pair of neighboring rails of the first set of rails and a pair of neighboring rails of the second set of rails; and
- a delivery column adapted for transport of a storage container arranged in a stack of storage containers beneath the container handling vehicle rail system between a container handling vehicle and a delivery port situated at a lower end of the delivery column.

The delivery system comprises a remotely operated delivery vehicle comprising a container carrier adapted to support the storage container. The delivery vehicle being further adapted to transport the storage container between the delivery port and a second location for handling of the storage container by at least one of a robotic operator and a human operator.

In one aspect, the invention is related to a remotely operated delivery vehicle for transport of a storage container between an automated storage and retrieval grid, configured to store a plurality of stacks of storage containers, and a second location for handling of the storage container by at least one of a robotic operator and a human operator, for example handling of items within the storage container.

The remotely operated delivery vehicle comprising;
- rolling devices being configured to move the remotely operated vehicle in a horizontal plane,
- rolling device motors for driving the rolling devices, and
- a power source configured to provide propulsion power to the rolling device motors.

The remotely operated delivery vehicle may further comprise a container carrier configured to receive the storage container from above and onto or at least partly into the container carrier, so that contents of the storage container are accessible by the at least one of the robotic operator and the human operator.

The rolling devices may be configured to move the remotely operated delivery vehicle along tracks of a delivery rail system comprising a set of parallel rails arranged in a horizontal plane (P1) and extending in a first direction (X), and a second set of parallel rails arranged in the horizontal plane (P1) and extending in a second direction (Y) which is orthogonal to the first direction (X).

The rolling devices may be connected to a vehicle body or vehicle base arranged below the container carrier. The container carrier may be connected directly to the vehicle body and/or connected to said body via a structure. In all cases, the container carrier would be situated above the vehicle body of the delivery vehicle.

In yet another exemplary configuration, the container carrier and the vehicle body may be provided in one unit.

In the following the term "remotely operated delivery vehicle" is referred to as the "delivery vehicle" and the term "automated storage and retrieval grid" is referred to as the "storage grid". The term "a storage container" is also known in prior art as "a bin".

The container carrier may be advantageously adapted such that it can receive a storage container from directly above the delivery vehicle, from a side of the delivery vehicle or a combination thereof.

In a preferable embodiment the container carrier is adapted receive a storage container from a delivery column of a storage and retrieval grid, when the delivery vehicle is located directly below the delivery column.

The delivery vehicle may comprise a vehicle body comprising one or more compartments for storing a power storage source such as a battery. The compartment(s) may also be adapted to store components such as rail shift motor, tilt motor, actuators, controllers, etc. The rolling device, such as wheels or driving belts, may be connected to the vehicle body and may be operated by an electric motor. The electric motor may for example be arranged at least partly within the rolling device such as a hub motor. Further, the electric motor may comprise permanent magnets such as a brushless electric DC (direct current) motor. For example, the electric motor may comprise a rotor comprising one or more permanent magnets and a stator in the form of electrical windings wrapped around yokes. An electric motor comprising stator magnets and rotor yokes/windings may also be envisaged. AC motors would also be a possibility.

The vehicle body may be a framework being similar to the framework disclosed in WO 2016/120075 A1, hereby incorporated by reference, though without a cavity configured to store a storage container there within. The vehicle body may be a height corresponding substantially to a diameter of the rolling devices.

In operation, the delivery vehicle may be operated such that it is positioned directly below, or substantially directly below, a delivery port of a delivery column of an automated storage and retrieval grid, such that it can receive a storage container from above and into its container carrier.

Due to the above-mentioned rolling devices and the associated rolling device motors and power source, the delivery vehicle may be adapted for self-propelled movement to a second location. It may comprise a robotic vehicle.

The delivery vehicle may receive a storage container onto or into the container carrier from a conveyor belt or other delivery systems capable of transporting storage containers. In this particular embodiment, the storage container may be slid or lifted onto the container carrier from at least one side of the delivery vehicle.

The delivery column may be referred to as a grid column which is used for transport of storage containers there through, hence being void of storage containers. The storage grid may thus comprise a location of the storage grid where the container handling vehicle can drop off and/or pick up storage containers for further transport to/from a desired storage column. The delivery column may be situated at any desired location within the storage grid, but preferably at or near the storage grid's perimeter.

The delivery column may comprise a pick-up or drop-off port situated at the upper level of the storage grid, i.e. the level where the container handling vehicle are operating, and a delivery port situated at a lower level/end of the storage grid. At the lower level/delivery port, the storage container can be inserted or removed from the delivery column, for example by aid of the delivery vehicle.

The delivery port may be an opening situated at the lowermost position of the delivery column allowing pick-up and/or drop-off of storage containers.

The storage containers may be transported through the delivery column by lifting means, for example in the form of a lifting device of the above mentioned prior art container handling vehicle.

Alternatively, the lifting means may be a dedicated lift configured to transport storage containers through the delivery column, for example a lift as disclosed in patent publication WO 2017/121515 A1, hereby incorporated by reference.

In one exemplary configuration, the storage containers may be transported in a loop between the delivery port and a predetermined second location. In this way, any storage container may be retrieved through the same delivery column as which it is deposited, or any other delivery column arranged for the same purpose.

Said loop may contain a plurality of circulating storage containers, thereby reducing or avoiding congestion on the rail system on one or more lateral sides of a delivery column.

A container handling vehicle may, after having deposited a storage container in the delivery column, pick up a new storage container for delivery to, or retrieval from, the same delivery column.

The remotely operated delivery vehicle may be configured to receive the storage container from a delivery port of the storage grid for transport to a second location in which the storage containers and/or product items within each storage container can be handled. Furthermore, the delivery vehicle may be configured to transport the storage container from the second location for delivery to the delivery port. In both cases, the storage container may be transported through the storage grid via the delivery column by lifting means/lifting device.

The second location may be any predetermined location appropriate for handling of the storage container by at least one of a robotic operator and human operator, for example acting as a picking or stocking station where product items are removed from, or placed into, the storage containers. The second location may be distant from the storage system.

The robotic or human operator may be for example a picker provided for handling the goods/items within the container. The pickers will be picking items from, or re-stocking items within, the container, or they will be handling the entire storage container by replacing, removing and/or inserting containers into the storage grid.

Further, the second location may be any predetermined location which allows storage containers to be accessed from a location outside and/or in connection with the storage grid.

The second location may be physically connected and/or in connection with the storage grid. The delivery vehicle operates independently between the delivery port and the second location.

In general, the second location may be any predetermined location reachable by the delivery vehicle when operating on a delivery rail system. The delivery rail system may be arranged between the second location and the one or more delivery ports of the storage grid. In this way the storage containers may be transported on the delivery vehicles between the delivery port and the second location without necessitating costly and/or ineffective infrastructure such as conveyer belts and/or human/robotic intervention. As explained above, the transport may be on top of the container carrier of the delivery vehicle. Further, each delivery vehicle may move independently in the X and Y directions along the delivery rail system.

The delivery rail system may be arranged on a level below a container handling vehicle rail system on which a plurality of container handling vehicles are operating. The delivery rail system, on which the delivery vehicles may operate, can be arranged in a grid pattern in the same way as, or similar to, the rail system of the container handling vehicles. The delivery rail system may extend across and below the lower level of the storage grid (below the delivery port(s)), covering at least one, preferably all, of the at least one delivery ports, as well as the distance from the storage grid to the second location.

Hence, the second location may be located at any predetermined location along the delivery rail system.

To get the most storage space for storage containers in the storage and retrieval grid, it may be advantageous to arrange the delivery rails system such that it extends as little as possible into the storage grid. That means that the storage and retrieval grid may comprise a plurality of storage columns extending from the upper level to the base of the storage grid, thus allowing the greatest possible storage capacity since the entire storage column may be used for storage.

In order to maintain greatest possible storage capacity, the part of the delivery rail system extending into the storage grid may be kept as small (little extent) as possible. Thus, the delivery rail system and the delivery vehicle may occupy as little space as possible of the storage and retrieval grid, the space which may be used for storage of storage containers.

Each grid cell of the delivery rail system may have a size which is equal or similar to the size of the grid cells of the rail system for the container handling vehicles. In addition to facilitate production and ensure costs by allowing use of already designed and tested components, the required alignment of the delivery vehicle below the upper rail system for the container handling vehicle becomes easier to achieve.

A typical width of each grid cell of the delivery rail system is within the interval of 30 to 150 cm, and a typical length is within the interval of 50 to 200 cm.

The widths and the lengths of each grid opening are typically 2 to 10 cm less than the widths and the lengths of the corresponding grid cell (FIG. 2C).

Since the delivery vehicle may be operating directly under the container handling vehicles on top of the storage grid, its dimensions may naturally correspond to the grid cell size of the storage grid above. Many of the same considerations as for the container handling vehicles apply, for example the ability for the vehicles to pass each other on adjacent grid cells. But for the delivery vehicle the single grid space configuration also has other advantages such as to avoid interference with upright members of the storage grid.

The inventive automatic storage and retrieval system is more effective than prior art systems by avoiding, or at least reducing, congestion of storage containers around the delivery columns of the storage grid. Thus, the capacity of the entire storage system is increased by the addition of a dedicated delivery rail system since the storage containers may be immediately and continuously moved away from the area of the delivery columns. This means that container handling vehicles do not need to wait for available delivery columns to drop off storage containers. In the same way, the container handling vehicles will continuously receive (pick up) storage containers from the delivery port for storage of the storage containers in the storage grid.

The delivery rail system may comprise a first set of parallel rails arranged in a horizontal plane to guide movement of the delivery vehicle in a first direction X across the level of the delivery rail system, and a second set of parallel rails arranged in the horizontal plane perpendicular to the first set of rails to guide movement of the delivery vehicle in a second direction Y which is perpendicular to the first direction X. In this way, the delivery rail system defines a grid pattern on which the delivery vehicle can move laterally. The grid pattern thus comprises a plurality of adjacent delivery vehicle grid cells, where each grid cell comprises a grid opening defined by a pair of neighboring rails of the first set or rails and a pair of neighboring rails of the second set of rails.

The delivery rail system may be a single track system. Alternatively, the rail system may be a double track system, for example where the two tracks in each rail are separated by a protrusion running midway. This double track system allows the delivery vehicle to have a footprint to be equal or less than the lateral extension of the grid cell, thereby allowing the delivery vehicle to travel along a row of grid cells even if another delivery vehicle is positioned at a grid cell neighboring that row. In the double track system, each delivery vehicle is configured to run on an inner rail of each double tracked rail. The vehicle body does therefore not extend beyond the halfway point of the parallel rail.

The delivery rail system may typically be located on a ground floor level, thereby allowing easy access to the storage containers for human and/or robotic operators. However, the delivery rail system may be located at any level below the top level of the storage grid. In a preferable configuration, the entire delivery rail system is located at a level below the pick-up and/or drop-off port of the storage grid.

The delivery system may comprise an interface connectable to a third-party storage, production and distribution system.

The delivery system may be integrable with a third-party storage, production and distribution system such that storage containers can be transported between the delivery system and the third-party storage, production and distribution system.

The delivery system of the present invention may be connected to a third-party storage, production and distribution system such as production facility, a storage grid, assembling facility, reception or shipping location, etc. The connection may be by means of a connectable rail system or a conveyor system comprising conveyors employed to transport the storage containers between the delivery system and the third-party storage, production and distribution system. The delivery vehicle may comprise a weighing mechanism in order to measure the weight of the storage container, for example a commercially available electronic weighing scale. Such a weighing mechanism may provide information concerning the content inside each storage container such as the total weight, the number of units, the internal weight distribution and/or the location within the storage grid the storage container should be placed.

For example, if a storage container is particularly heavy, it may be advisable to place this storage container deep within the storage grid. It may alternatively, or in addition, be advisable to transmit an alert signal to the human and/or robotic operator which should be handling the particular storage container.

The container carrier of the delivery vehicle may be a container supporting device for supporting the storage container from below.

The supporting device may be (or may comprise) a base plate, a conveyor, and/or any other structure that is able to carry a storage container from below.

In order to stabilize the storage container in the horizontal plane (P) the supporting device may comprise at least one elevated edge arranged at or near the periphery of the base plate, conveyor and/or the like.

The container supporting device may be arranged either for supporting the storage container from below or holding/suspending the storage container from the at least one elevated edge or a combination thereof.

The container supporting device may be at least any one of a lid, a tray, a box or a crate.

The supporting device may comprise a base plate with elevated edges such that it forms a compartment with a compartment size adapted to receive a storage container. The compartment may be adapted to receive at least a lower section of the storage container, for example at least the base of the storage container.

Further, the compartment may be arranged for fully containing the storage container.

In a mixed storage container system, the size of the compartment of the supporting device may be adapted to correspond to the size of the largest storage containers of the storage grid, such that the compartment can receive both small and large size storage containers. The large size containers can be supported by a platform or a structure from below, while the small size containers can be supported by the elevated edges of the compartment. Further, the container carrier may comprise a conveyor.

The conveyor may comprise rolls with or without integrated motor(s) mounted between supports for respective ends of the rolls (such as parallel railings). The rolls allow the storage container to be shifted into or out of the container carrier. In addition, the rolls provide support from below for the storage container while situated on the delivery vehicle.

Different kinds of conveyors may be used such as conveyor belts, wheels, balls, rods or any similar means adapted for the easy moving of storage container into or out of the container carrier.

The container carrier of the delivery vehicle may comprise a displacement device arranged for moving the container carrier relative to the rolling devices of the delivery vehicle. The displacement device may in general move the container carrier in any direction, for example vertically, thereby acting as a lift device, and/or to any side by horizontal displacements and/or by tilting the container carrier around a pivot axis using a tilt device. The latter facilitates the handling or the picking operation, in particular during handling of a human operator. The tilting movement is preferably around one of the principal moving directions of the delivery vehicle, for example around the X and/or the Y direction.

The pivot axis may hence be parallel to a first set of rolling devices or parallel to a second set of rolling devices, or both.

The above embodiments allow the storage container situated on top of the container carrier to be tilted towards the user at the second location or at any preferred location. The tilted position of the storage container thereby allows a human operator to easily view the contents stored in the storage container, in addition to improving the working position of said operator while retrieving items and/or inserting items from/to the storage container. The tilting angle range may be from 2° to 60° relative to one or both sides of the pivot axis relative to the horizontal plane, more preferably from 3° to 50°, even more preferably from 4° to 45°, even more preferably from 5° to 40°, even more preferably from 6° to 35°, even more preferably from 7° to 30°, even more preferably from 8° to 25°, even more preferably from 9° to 20°, for example 15°. The ability to tilt the storage container allows inter alia a human operator to view and/or access the times within the storage container more easily.

In general, the tilting angle should not exceed a maximum tilting angle that would represent a significant risk of stored items/articles tipping out of the storage container in question. This maximum allowed tilting angle depends on the amount and size of items/articles within the storage container. A storage container being filled with items up to its upper rim will have a lower maximum tilting range that a storage container having items filling the containers' vertical height only partly.

The displacement device may comprise a lifting arm connected to the container carrier, which lifting arm is operated by a tilt motor situated in the vehicle body. The tilting arm may also be operated by a linear actuator. The operational range of the displacement device may be governed by a set maximum tilting range. For example, a tilting arm connected linear actuator may be configured to allow tilting up to 30°, up to 25°, up to 20° or up to 15°. The tilting angle may be fixed or adjustable. In the latter case, any adjustment may be achieved by remote control and/or by manual interaction by a human operator.

A motor providing the necessary power to drive the delivery vehicle in the X or Y direction may be one or more dedicated electric, for example arranged at least partly, preferably fully, within the rolling device.

The rolling devices may be any device ensuring horizontal propulsion of the delivery vehicle, for example wheels and/or belts In a preferred embodiment, the delivery vehicle comprises a wheel arrangement. The wheel arrangement may further comprise a first set of wheels, arranged at opposite portions of the vehicle body or vehicle base, for moving the delivery vehicle along a first direction (X) on a delivery rail system; and a second set of wheels, arranged at opposite portions of the vehicle body or vehicle base, for moving the delivery vehicle along a second direction (Y) on the delivery rail system, the second direction (Y) being perpendicular to the first direction (X).

The delivery vehicle may comprise a vehicle body and a wheel arrangement of eight wheels, where a first set of four wheels enable the lateral movement of the delivery vehicle in the first direction (X) and a second set of the remaining four wheels enable the lateral movement in the second direction (Y). One or both sets of wheels in the wheel arrangement may be lifted and lowered, so that the first set of wheels and/or the second set of wheels can be engaged with the respective set of rails provided on the delivery rail system, at any one time.

As mentioned above, the delivery vehicle may have a footprint, i.e. an extent in the X and Y directions, which is generally equal to the horizontal extent of a grid cell of the delivery rail system i.e. the extent of a grid cell in the X and Y directions.

Alternatively, the delivery vehicle may have a footprint which is larger than the lateral extent of a grid cell of the delivery rail system.

In a second aspect, the invention concerns an automated storage and retrieval system.

The automated storage and retrieval system may comprise an automated storage and retrieval grid and a delivery system that may be arranged for transport of a storage container between the storage grid and a second location. The second location may be a location where a robot operator and/or a human operator handles the storage container, for example by storing and/or retrieving items there within.

The grid may comprise a container handling vehicle rail system for guiding a plurality of container handling vehicles, the rail system comprising a first set of parallel rails arranged in a horizontal plane and extending in a first direction, and a second set of parallel rails arranged in the horizontal plane and extending in a second direction which is orthogonal to the first direction, which first and second sets of rails form a grid pattern in the horizontal plane. The sets of rails define a grid comprising a plurality of adjacent container handling vehicle grid cells, where each container handling vehicle grid cell comprises a container handling vehicle grid opening defined by a pair of neighboring rails of the first set of rails and a pair of neighboring rails of the second set of rails; and a delivery column adapted for transport of a storage container arranged in a stack of storage containers beneath the container handling vehicle rail system between a container handling vehicle and a delivery port situated at a lower end of the delivery column.

The delivery system may comprise a remotely operated delivery vehicle comprising a container carrier configured to support the storage container. The delivery vehicle may be adapted to transport the container carrier between a delivery port and a second location for handling of the storage container by at least one of a robotic operator and a human operator.

The delivery vehicle may comprise rolling devices connected to a vehicle body or a vehicle base arranged below the container carrier.

As described earlier, the delivery column may comprise a delivery port situated at the lowermost end of the delivery column. In operation, the storage container may be transported through the storage column and to the delivery port where it is placed onto or into a delivery vehicle. Accordingly, the delivery vehicle may deliver a storage container to the delivery port for transport through the delivery column and to be received by a container handling vehicle.

The delivery system of the automated storage and retrieval system may further comprise a delivery rail system below the delivery port. The delivery rail system may further be arranged such that the delivery vehicle can operate on said rail system when moving between the delivery port and a predetermined second location.

Each of the at least one delivery rail system may comprise a first set of parallel rails arranged in a horizontal plane (P1) and extending in a first direction (X), and a second set of parallel rails arranged in the horizontal plane (P1) and extending in a second direction (Y) which is orthogonal to the first direction (X). The first and second sets of rails define a grid in the horizontal plane (P1) comprising a plurality of adjacent delivery vehicle grid cells, each delivery vehicle grid cell comprising a delivery vehicle grid opening defined by a pair of neighboring rails of the first set of rails and a pair of neighboring rails of the second set of rails.

Each of the first and second set of rails of the delivery rail system may be a double track rail comprising two parallel tracks separated by a protrusion running midway.

Furthermore, each of the first and second set of rails of the container handling vehicle rail system may be a double track rail comprising two parallel tracks separated by a protrusion running midway.

The remotely operated delivery vehicle may have a delivery vehicle footprint with a horizontal extent which is equal to or less than the horizontal extent of the delivery vehicle grid cell.

Moreover, at least one, preferably each, of the plurality of delivery vehicle grid cells of the delivery rail system may be arranged directly below a container handling vehicle grid cell of the container handling vehicle rail system. The delivery rail system may extend within the framework structure of the storage grid. The second location would thus be located inside the framework structure of the storage grid.

The delivery rail system may extend to the outside the framework structure of the storage grid, preferably to the second location. When the second location is located outside the storage grid, they do not take up storage capacity of the grid.

The delivery rail system may comprise a first rail system located within the framework structure of the storage grid, and a second rail system located outside the framework structure of the storage grid, and wherein the first and second rail system are connected such that the delivery vehicle may operate between said rail systems.

The second location may be connected to the second rail system.

The second location may be situated at any location on the delivery rail system at which, or through which, storage containers can be deposited and/or retrieved. Since the second location can be any predetermined location on the delivery rail system, said second location can be moved, a new second location can be established/opened, or an existing second location can be removed/closed.

In a third aspect the present invention is directed to a method of transporting a storage container between an automated storage and retrieval grid and a second location for handling of the storage container by at least one of a robotic operator and human operator.

The automated storage and retrieval grid may comprise a container handling vehicle rail system comprising a first set of parallel rails arranged in a horizontal plane and extending in a first direction, and a second set of parallel rails arranged in the horizontal plane and extending in a second direction which is orthogonal to the first direction, which first and second sets of rails define a grid in the horizontal plane comprising a plurality of adjacent container handling vehicle grid cells, where each grid cell comprises a container handling vehicle grid opening defined by a pair of neighboring rails of the first set of rails and a pair of neighboring rails of the second set of rails; and a plurality of stacks of storage containers arranged in storage columns located beneath the container handling vehicle rail system, wherein each storage column is located vertically below a container handling vehicle grid opening.

The system may further comprise a delivery column configured to receive a storage container from a container handling vehicle.

The method may comprise the step of:
 lowering the storage container through the at least one delivery column to a delivery port,
 positioning a delivery vehicle below the delivery port for receiving a storage container onto a container carrier, and
 delivering the storage container to the second location by operating the rolling devices of the remotely operated delivery vehicle on a delivery rail system.

The method may further comprise the step of tilting the container carrier at the second location, preferably within a tilting angle range between 2° and 60° relative to the horizontal plane (P,P1) or any of the tiling angle ranges mentioned above.

The second location may comprise a picking station and the tilting of the storage container may be for assisting with a picking operation.

The method may further comprise the step of operating the remotely operated vehicle to return to the delivery port by operating the rolling devices of the remotely operated delivery vehicle on the delivery rail system and lifting the storage container through the delivery column for storage of the storage container in the automated storage and retrieval grid.

In a fourth aspect, the present invention concerns an automated storage and retrieval system comprising an automated storage and retrieval grid and a remotely operated carrier vehicle.

The automated storage and retrieval grid comprises a rail system for guiding the remotely operated container carrying vehicle operating on the rail system.

The rail system may comprise a first set of parallel rails arranged in a horizontal plane (P) and extending in a first direction (X) and a second set of parallel rails arranged in the horizontal plane (P) and extending in a second direction (Y) which is orthogonal to the first direction (X).

The first and second sets of rails form a grid pattern in the horizontal plane (P) comprising a plurality of adjacent grid cells, each grid cell comprising a grid opening defined by a pair of neighboring rails of the first set of rails and a pair of neighboring rails of the second set of rails. Each rail may comprise a pair of tracks, where each track is configured to guide a wheel in the first or second direction (X,Y).

The container carrying vehicle may include rolling means comprising a first set of wheels arranged symmetrically around a vertical mid plane of the vehicle oriented in the first direction (X) for moving the container carrying vehicle along the first direction (X) on the rail system and a second set of wheels arranged symmetrically around a vertical mid plane of the container carrying vehicle oriented in the second direction (X) for moving the container carrying vehicle along the second direction (Y) on the rail system. At least one of the first and second set of wheels are vertically displaceable relative to the rail system by means of a displacement motor.

The container carrying vehicle further comprises a container carrier adapted to support a storage container from below. The container carrier may be tiltable.

The automated storage and retrieval system according to the fourth aspect may comprise any of the features mentioned in relation to the first, second and/or third aspect.

In particular, the rail system of the fourth aspect may comprise any of the features describing the automated storage and retrieval grid mentioned in relation to the second and/or third aspect.

Further, the container carrying vehicle of the fourth aspect may comprise any of the features describing the remotely operated delivery vehicle mentioned in relation to the first, second and/or third aspect.

For the fourth aspect of the present invention, one or more of the container carrying vehicles may cooperate with one or more container handling vehicles delivering and retrieving storage containers within underlying stacks. For example, the container carrying vehicles may have as a purpose to act as additional storage locations for storage containers such as storage containers required to be stored on the grid for short periods of time. At other times the container carrying vehicle may be delivering or retrieving storage containers between two locations.

BRIEF DESCRIPTION OF THE DRAWINGS

The following drawings depict exemplary embodiments of the present invention and are appended to facilitate the understanding of the invention.

FIG. 1C shows the complete system and FIG. 1B and FIG. 1D shows examples of system operable prior art container handling vehicles.

FIG. 2A shows a single track system, FIG. 2B shows a double track system 2B and FIG. 2 C shows a double track system indicated width and length of a container handling vehicle grid cell.

FIG. 6 B is a perspective view of the remotely operated delivery vehicle of FIG. 3 A-C disclosing the operation of the wheels.

FIG. 11 B is a side view of another automated embodiment storage and retrieval grid and a delivery system according to the present invention.

DETAILED DESCRIPTION OF THE INVENTION

Figure 1:
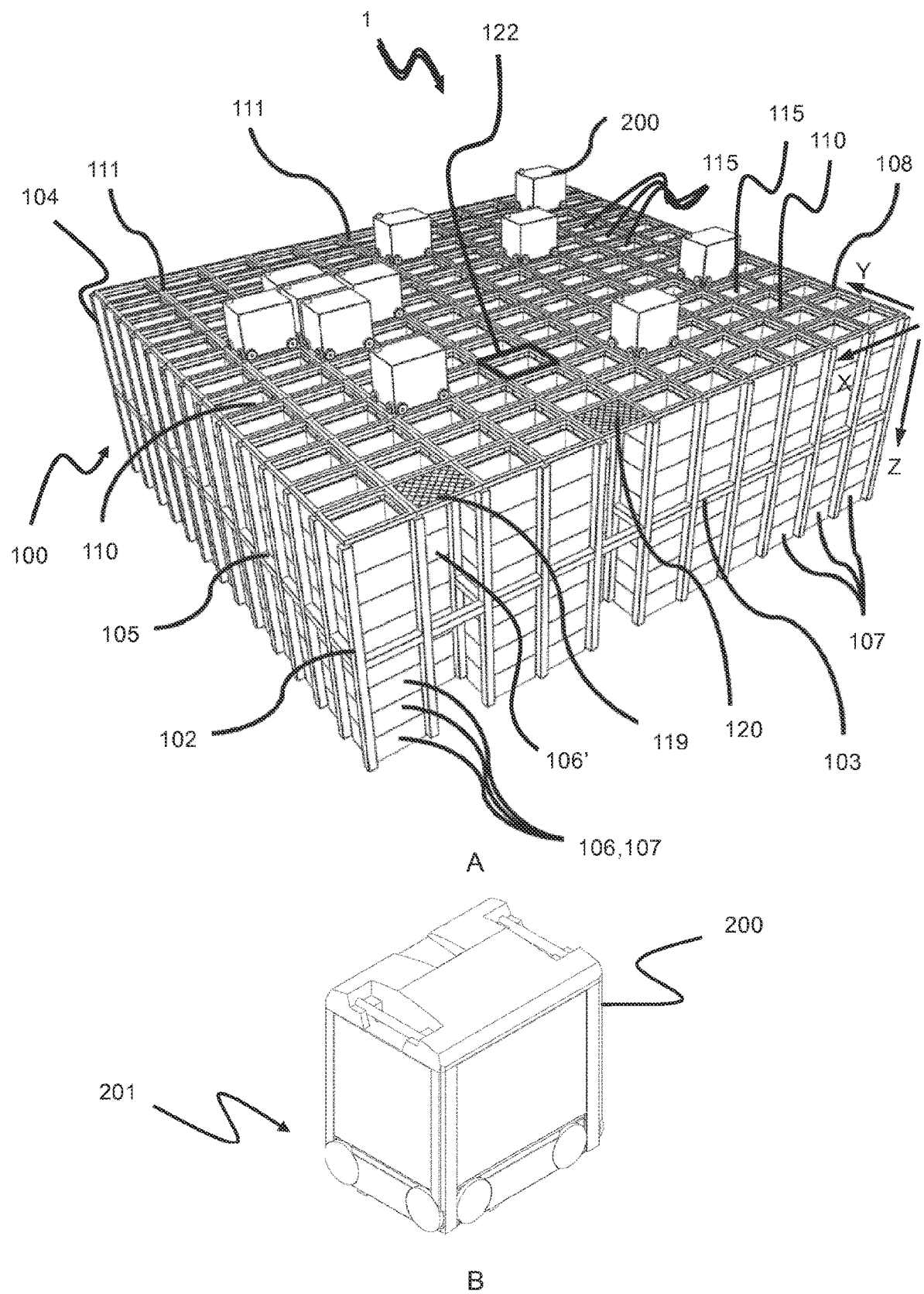
FIG. 1 A-D are perspectives view of a prior art automated storage and retrieval system, where FIG. 1A
Figure 1:
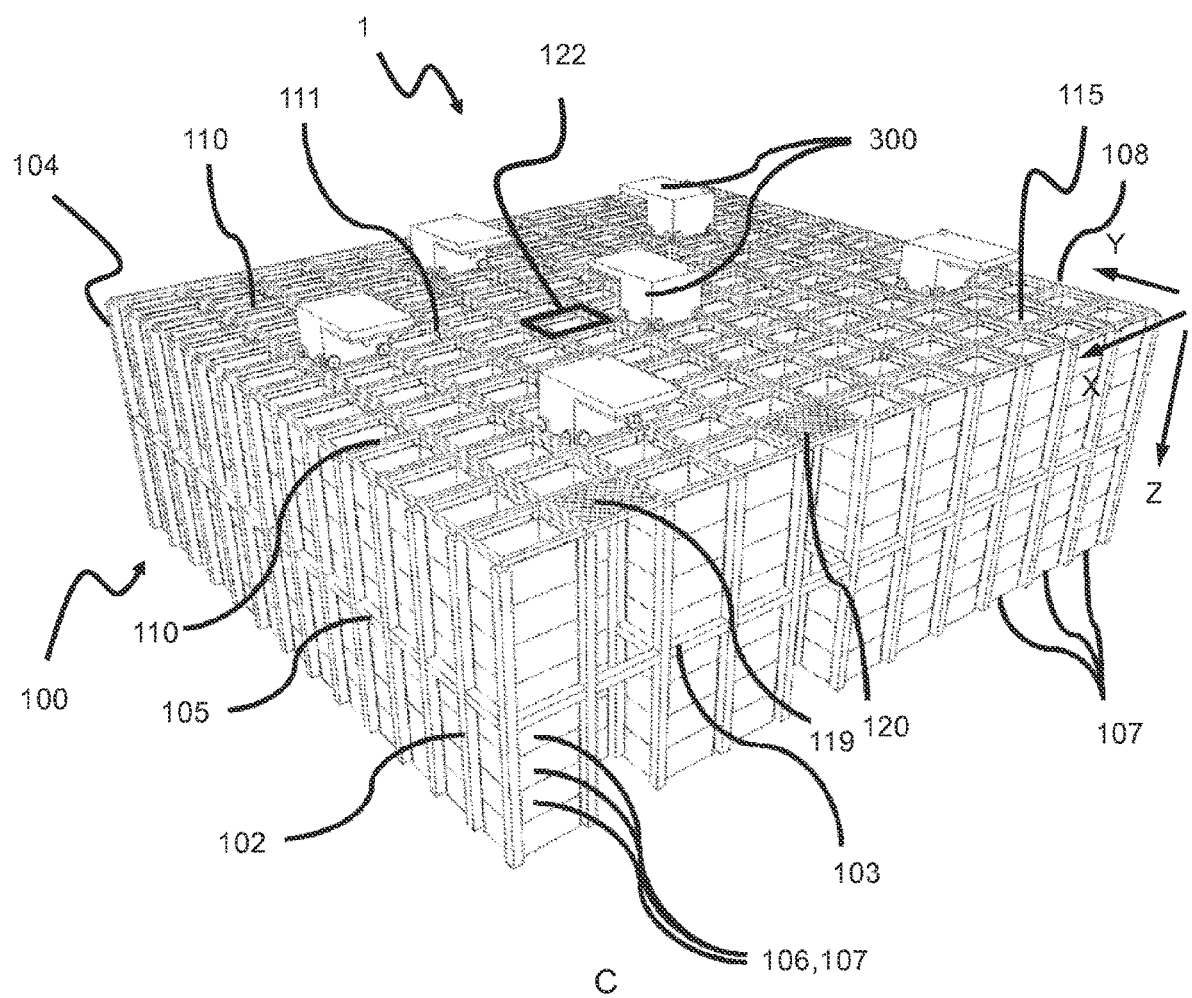
Figure 1:
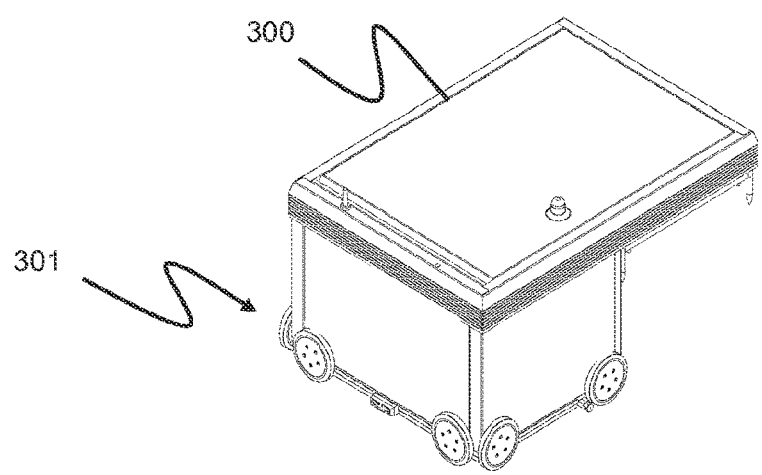

In the following, embodiments of the invention will be discussed in more detail with reference to the appended drawings. It should be understood, however, that the drawings are not intended to limit the invention to the subject-matter depicted in the drawings. Furthermore, even if some of the features are described in relation to the system only, it is apparent that they are valid for the delivery vehicles and related methods as well, and vice versa. Hence, any features described in relation to the delivery vehicle only, and/or related methods, are also valid for the system.

With reference to FIGS. 1A-D the storage grid 104 of each storage structure 1 constitutes a framework 100 of in total 143 grid columns 112, where the width and length of the framework corresponds to the width and length of 13 and 11 grid columns 112, respectively. The top layer of the framework 100 is a rail system 108 onto which a plurality of container handling vehicles 200,300 are operated.

Figure 2:
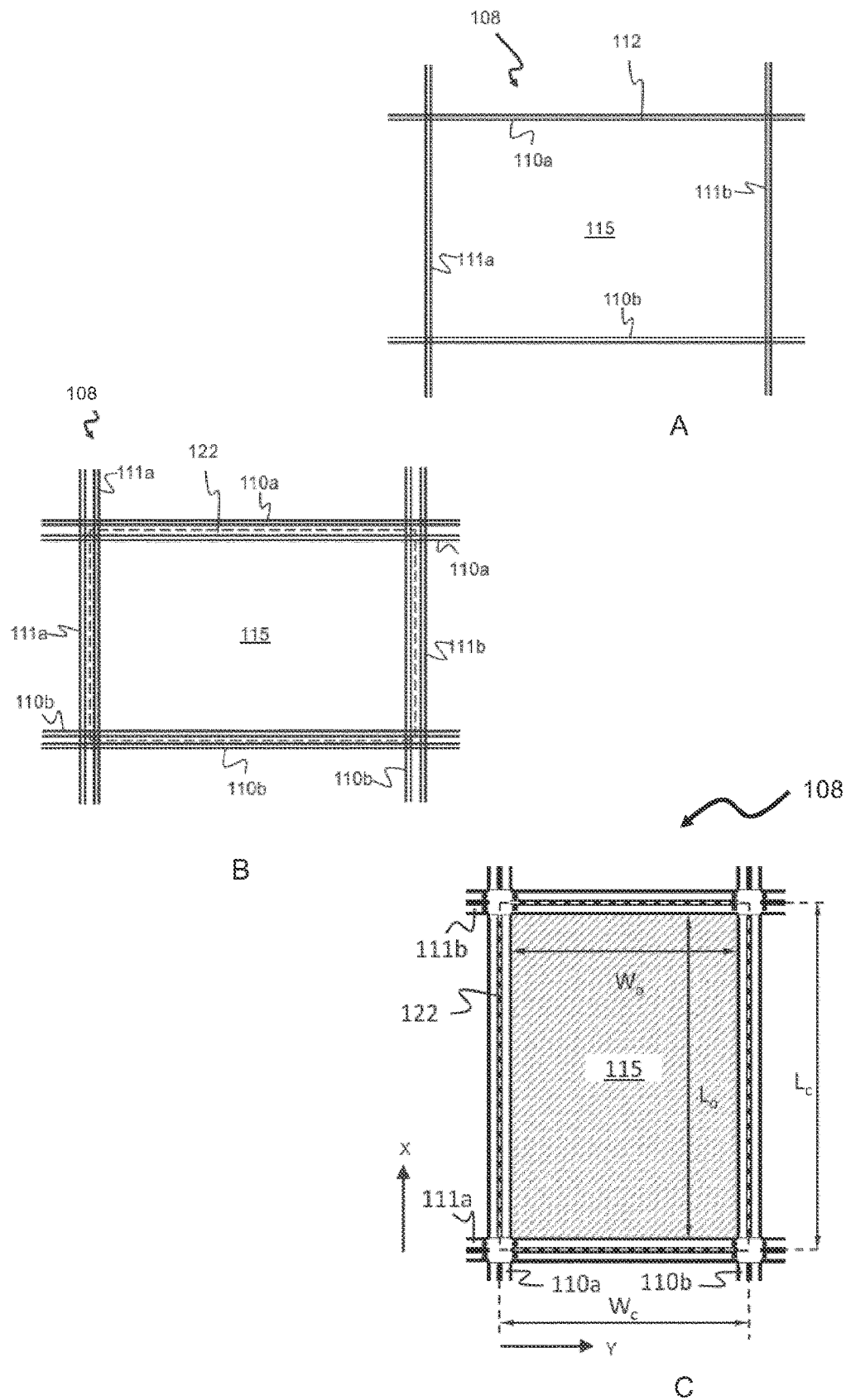
FIG. 2 A-C is a top view of a container handling vehicle rail system, where

The framework 100 of the storage system 1 is constructed in accordance with the above mentioned prior art framework 100 described above, i.e. a plurality of upright members 102 and a plurality of horizontal members 103 which are supported by the upright members 102, and further that the horizontal members 103 includes a container handling vehicle rail system 108 of parallel rails 110,111 in the X direction and the Y direction, respectively, arranged across the top of storage columns 105. The horizontal area of a single grid cell 122, i.e. along the X and Y directions, may be defined by the distance between adjacent rails 110 and 111, respectively (see also FIG. 2). In FIGS. 1A and 1C, such a grid cell 122 is marked on the rail system 108 by thick lines.

The container handling vehicle rail system 108 allows the container handling vehicles 200,300 to move horizontally between different grid locations, where each grid location is associated with a grid cell 122.

In FIGS. 1A and 1C the storage grid 104 is shown with a height of eight cells. It is understood, however, that the storage grid 104 can in principle be of any size. In particular it is understood that storage grid 104 can be considerably wider and/or longer than disclosed in FIGS. 1A and 1C. For example, the grid 104 may have a horizontal extent of more than 700×700 grid cells 122. Also, the grid 104 can be considerably deeper than disclosed in FIGS. 1A and 1C. For example, the storage grid 104 may be more than twelve grid cells deep.

The storage container vehicles 200,300 may be of any type known in the art, e.g. any one of the automated container handling vehicles disclosed in WO2014/090684 A1, in NO317366 or in WO2015/193278A1.

The rail system 108 may be a single track system, as is shown in FIG. 2A. Alternatively, the rail system 108 may be a double track system, as is shown in FIG. 2B. Details of the single and double track system are disclosed this specification under the section of background and prior art.

Figure 3:
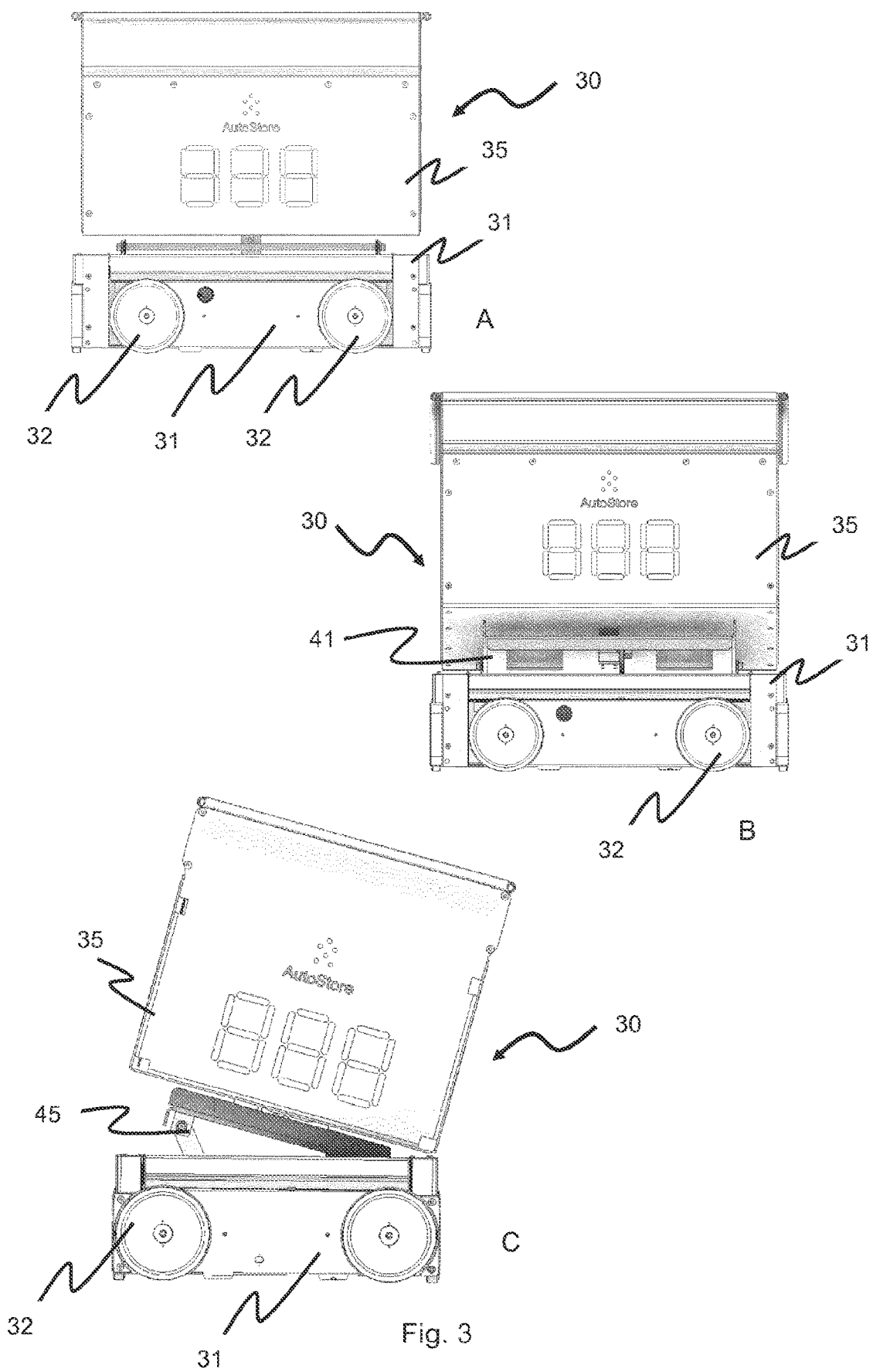
FIG. 3 A-C is a side view of a remotely operated delivery vehicle according to an embodiment of the invention.

FIG. 3 A-C shows an embodiment of a remotely operated delivery vehicle 30 according to the present invention, hereinafter referred to as a delivery vehicle 30.

The delivery vehicle 30 is configured for transport of one or more storage container 106 (not shown) between an automated storage and retrieval grid 104 (not shown) configured to store a plurality of stacks 107 of storage containers 106, hereinafter referred to as a storage grid 104, and a second location for handling of the storage container (106) by at least one of a robotic operator and human operator (not shown). The delivery vehicle 30 may be configured for transport of only one storage container 106, or may be configured for transport of more than on storage containers simultaneously.

Said delivery vehicle 30 comprises; a vehicle body 31, rolling devices 32 connected to the vehicle body 31, rolling device motors for driving the rolling devices 32 in a horizontal plane (P1), and a power source 43 connected to the rolling device motors. The power source 43 should provide sufficient power to the rolling device motors to propel the rolling devices 32 over a set route from the storage grid 104, for example to the second location.

The delivery vehicle 30 may further comprise a container carrier 35 mounted above the vehicle body 31. The container carrier 35 should be configured to receive the storage container 106 onto or within the container carrier 35 such that the storage container 106 is hindered to move relative to the container carrier in the horizontal direction.

The container carrier 35 may comprise a container supporting device supporting the storage container 106 from below. The form of the container supporting device may be any that ensure stable support, for example in the shape of a cup, a cradle, a seat, a frame, a holder or a platform.

In FIG. 3 A-C the container carrier 35 is disclosed in the form of a storage container receiving compartment having a bottom/base and side walls. The volume of the compartment is in this exemplary configuration such that it may receive and contain the entire horizontal extent of the storage container and at least a part of the vertical extent of the storage container. FIGS. 3-6 shows examples of container carriers 35 containing an entire storage container 106 and FIG. 7 A-C shows an alternative container carrier 35 containing a part of the storage container 106.

The particular configuration of the container carrier 35 disclosed in FIGS. 3-6 allows the delivery vehicle 30 to transport of a storage container 106 having different heights.

Note that the size of the compartment within the container carrier 35 may easily be adapted for receiving and supporting a multiple number of storage containers 106 in one operation.

FIGS. 3 B and C shows a particular configuration of the delivery vehicle 30, where the container carrier 35 may be set in a tilted position relative to the vehicle body 31 and the horizontal plane (P1). The container carrier 35 may be tilted by means of a dedicated displacement device 41. The tilting may be around a pivot axis directed in the principal moving direction of the delivery vehicle 30. If the delivery vehicle 30 is moving on perpendicular rails (see below), these principal directions would be in either the X direction or the Y direction.

The tilting of the displacement device 41 may for example be obtained by a lifting arm 45 coupled to the vehicle body 31 and the container carrier 35. Further, the lifting arm 45 may be driven by a dedicated tilt motor (not shown) or the rolling device motor or both.

Figure 4:
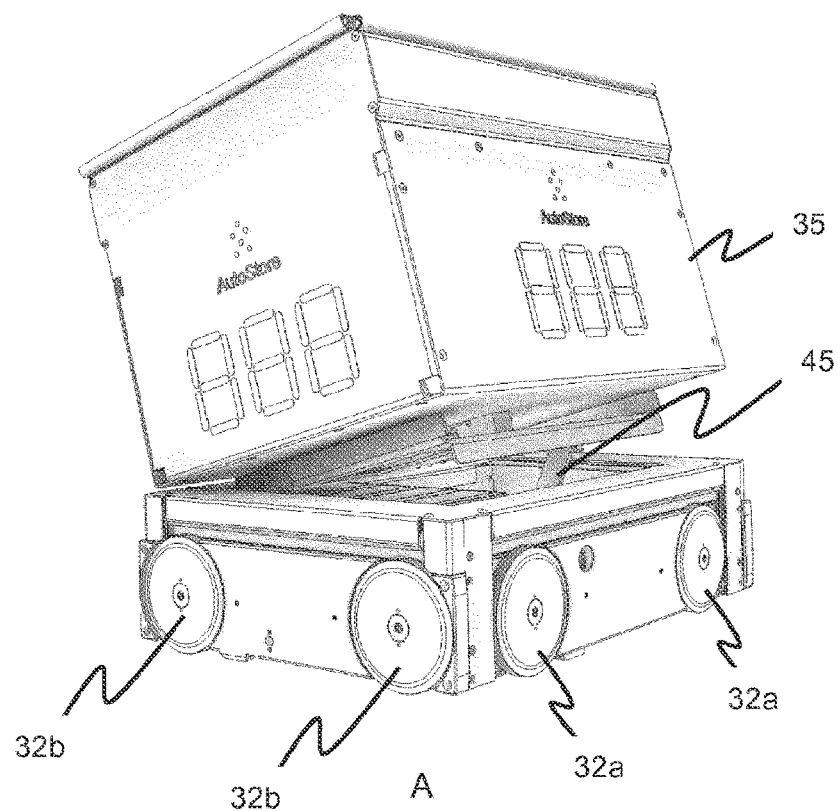
FIG. 4 A-B is a perspective view of the remotely operated delivery vehicle of FIG. 3 A-C.
Figure 4:
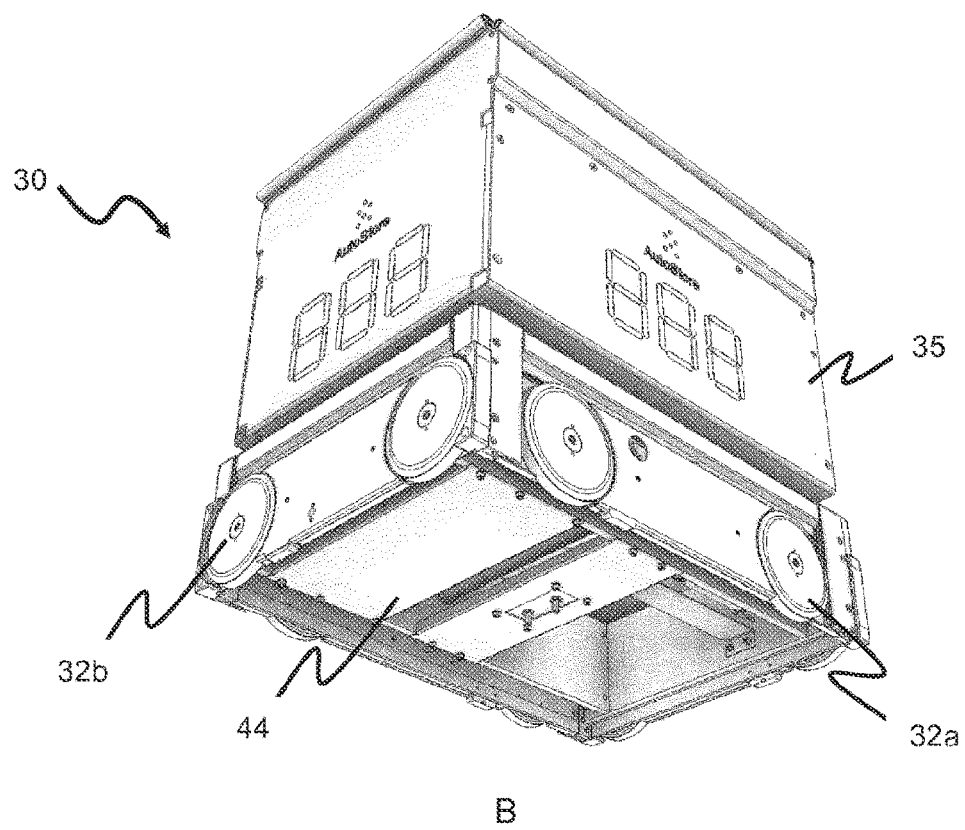

FIG. 4 A-B shows additional perspective views of the delivery vehicle 30. The rolling device 32 comprises in this exemplary configuration:
  a first set of wheels 32a arranged at opposite portions of a vertical centre plane through the vehicle body 31 for moving delivery vehicle 30 along a first direction, for example along an X-direction on a delivery rail system; and
  a second set of wheels 32b arranged at opposite portions of a vertical centre plane through the vehicle body 31 for moving the delivery vehicle 30 along a second direction, for example along a Y-direction on the delivery rail system perpendicular to the first direction X.

An example of a delivery rail system will be further described in FIG. 9-12.

Figure 5:
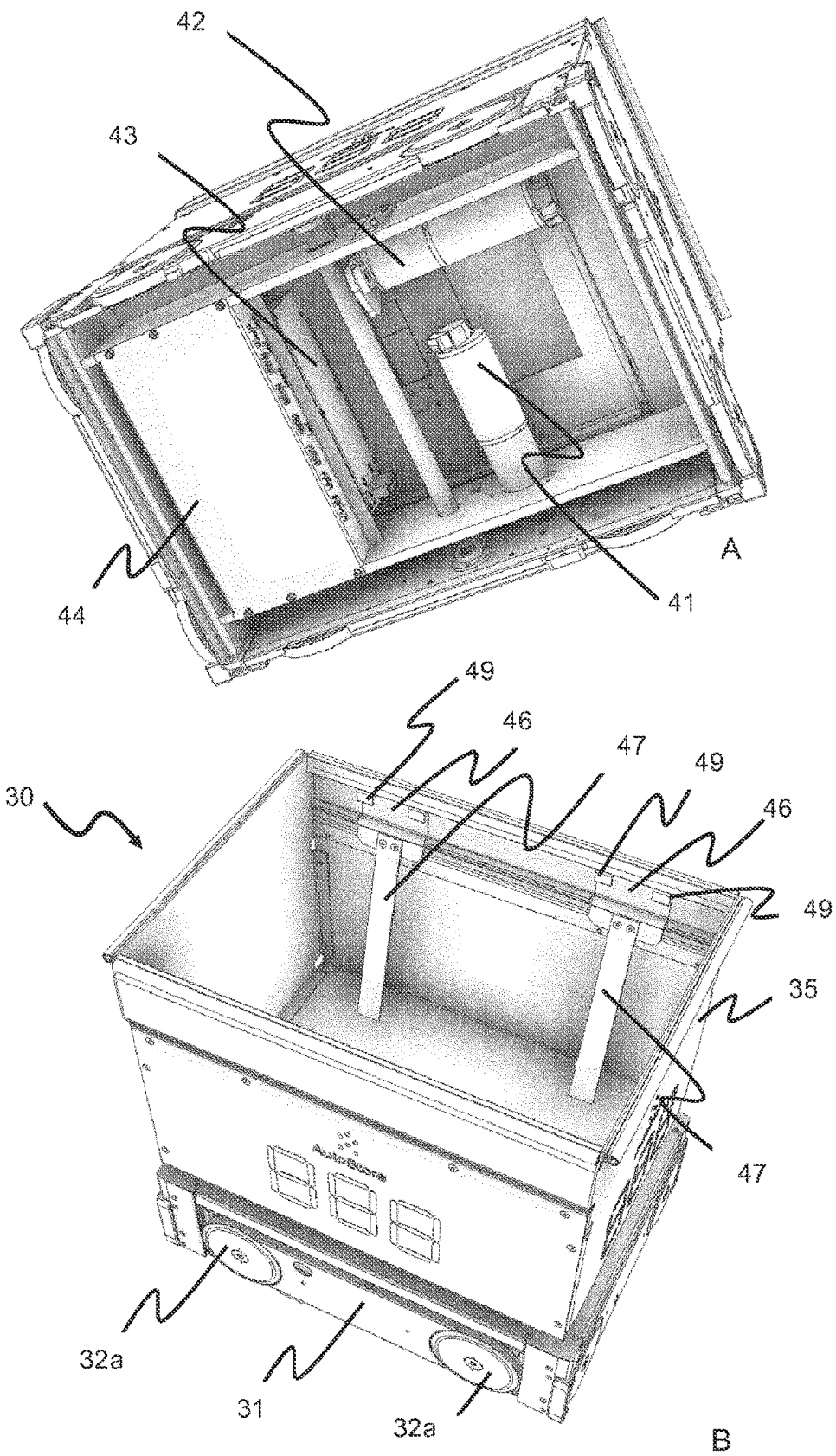
FIG. 5 A-B is a perspective view of the remotely operated delivery vehicle of FIG. 3 A-C, from the underside and from the above.

FIGS. 5 A and B shows the delivery vehicle 30 from below and from above, respectively. As clearly seen in FIG. 5 A the vehicle body 31 of the delivery vehicle 30 comprises an internal component receiving recess or compartment for containing components such as one or more dedicated tilt motors 41, one or more rail shift motors 42, one or more power storage sources such as a battery 43 and one or more control cards such as CPU and/or Power PCB 44. The above-mentioned components are thus located within the vehicle body 31, below the container carrier 35.

As best disclosed in FIG. 5 B the storage container receiving compartment of the container carrier 35 has in this particular configuration a rectangular bottom plate or base plate with vertical side walls. The vertical side walls can be of any height as long as they ensure that the storage container 106 is restricted to move along the base plate of the container carrier.

For example, the size of the compartment 35 may correspond to the size of a storage container 106, thereby fully containing the storage container 106.

The delivery vehicle may have a footprint, i.e. an extent in the X and Y directions, which is generally equal to the horizontal extent of a grid cell of the delivery rail system i.e. the extent of a grid cell in the X and Y directions. Accordingly, the size of the base plate of the compartment 35, in the X and Y direction, may be within these given perimeters.

In case of a container carrier 35 being configured to support a multiple number of storage containers 106, the size of the vertical walls may in one example be the height of each storage container 106 and the size of the base plate may be the sum of the cross-sectional area of all storage containers 106 measured relative to their outer lateral extremities.

FIG. 5 B further shows that the container carrier 35 may comprise a dedicated holding device 46,47,49 for the one or more storage containers 106 to allow storage containers 106 of different vertical heights to be stored in the same delivery vehicle 30. In the exemplary configuration shown in FIG. 5 B the holding device comprises a support element 46 having a top surface 49 and connected to an actuator lever 47. The support element 46 is connected to the inner walls of the container carrier 35, for example at the upper half of the container carrier 35.

The holding device may be arranged in the following exemplary way.

The storage container holding device comprises a support element 46 having a top surface 49 at one end and connected to an actuator lever 47 at the opposite end. The support element is pivotably connected to an inner top part of a side wall of the compartment 35. The actuator lever 47 is arranged with an inclined angle such that it protrudes into the compartment 35, and such that during introduction of the storage container 106 into the compartment 35, a bottom edge of the storage container 106 will push the actuator levers 47 from the protruding position in which it is in contact with the bottom edge of the storage container, to a substantial vertical position.

Since the actuator lever 47 is pivotably connected to the support element 46, the movement of the actuator lever 47 provides a corresponding movement of the top surface 49 provided at the opposite end of the support element 46. Accordingly, during introduction of the storage container 106 into the compartment 35, the top surface 49 will move from a first position in which it is not in contact with a top edge of the storage container, to a second position in which it is in contact with the top edge of the storage container, when the storage container 106 is fully accommodated in the compartment 35. Wherein in the second position, the top edge (not shown) of the storage container is supported by the top surface 49.

The actuator lever 47 may be pre-tensioned by a spring (not shown), such that the actuator levers 47 return to their non-actuated position (protruding position) when the storage container 106 is lifted off, or out of, the compartment 35.

By supporting the storage container 106 via the external top edge (not shown) of the storage container 106, the storage container 106 is always held at a predetermined level relative the base plate of the compartment 35.

The support element 46, the top surface 49 and the actuator lever 47 can be made in one piece.

Figure 6:
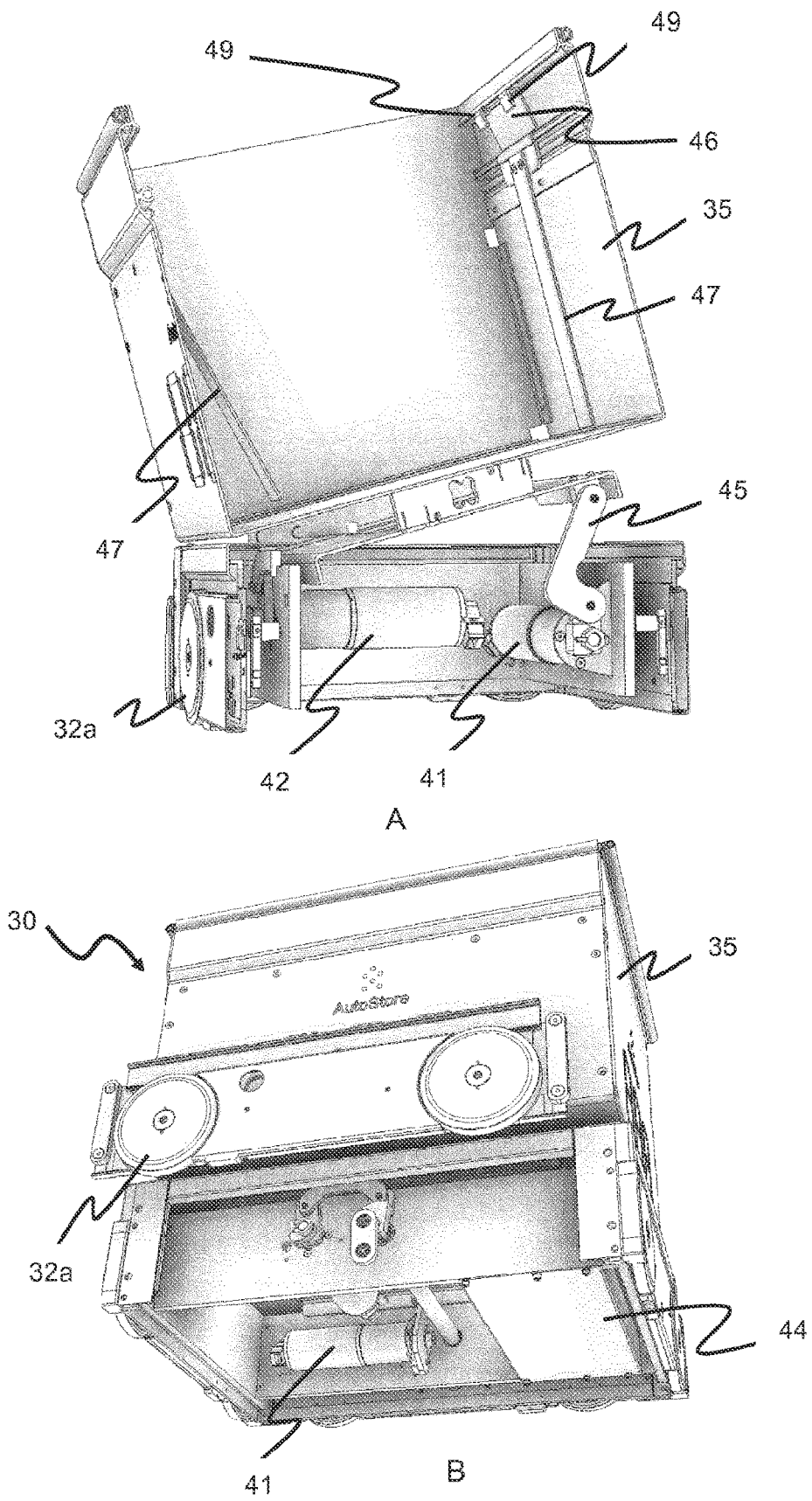
FIG. 6 A is a cross sectional view of the remotely operated delivery vehicle of FIG. 3 A-C.

FIG. 6 A shows a perspective side view of the delivery vehicle 30 where the container carrier 35 is tilted around a rotational axis directed in one of the principal moving direction of the storage container 106, i.e. the first or the second direction as described above.

The tilting of the displacement device 41 may for example be obtained by a lifting arm 45.

The container carrier 35 can be tilted towards one of the longitudinal sides such that the storage container 106 can be easily accessed by a human operator responsible for picking items from within the container carrier 35.

The displacement device 41 is in FIG. 6 A shown with an L-shaped lifting arm 45 connected at one side to the vehicle body 31 and the opposite side connected to a structure fixed to the container carrier 35. The latter end of the arm 45 may also be connected directly to the container carrier 35.

The tilt motor 41 is seen arranged fully inside the vehicle body 31 and is connected to the lifting arm 45, directly or indirectly, for moving the lifting arm 45 between a lower position in which the container carrier 35 is not tilted relative to the horizontal plane (P) and an upper position in which the container carrier 35 is tilted relative to the horizontal plane (P). Note that the horizontal plane (P) may be defined as the plane set up by the particular configurations of the wheels 32a,32b of the rolling device 32.

FIG. 6 B shows the delivery vehicle 30 as described above with the vehicle body 31 and the rolling device 32 of eight wheels 32a,32b. As for the delivery vehicle shown in FIGS. 3-5, the first set of four wheels 32a enable lateral or horizontal movement of the delivery vehicle 30 in a first direction and the second set of the remaining four wheels 32b enable the lateral or horizontal movement in the second direction which may be perpendicular to the first direction.

If used on a delivery rail system 50 (see below) one or both sets of wheels 32a,32b of the rolling device 32 should be lifted and lowered so that the first set of wheels 32a and/or the second set of wheels 32b can be engaged with the respective set of rails provided on the delivery rail system 50 any one time.

Figure 7:
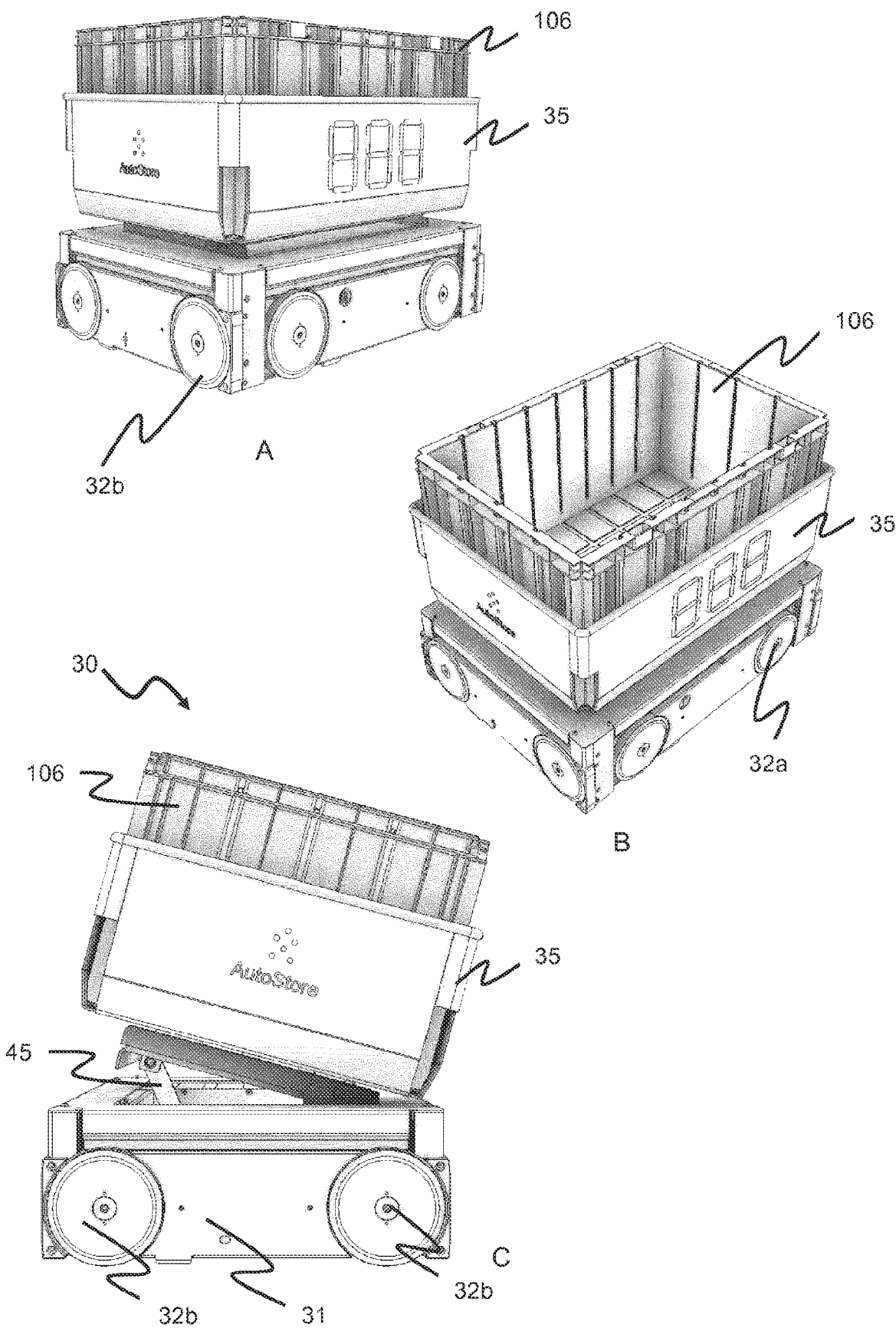
FIG. 7 A-C is a perspective view of another embodiment of the remotely operated delivery vehicle having a container carrier with a compartment for holding the storage container.

FIG. 7 A-C shows another exemplary configuration of a remotely operated delivery vehicle 30 according to the invention. Similar to the container carrier 35 described above, the container carrier 35 of this configuration is a container supporting device for supporting the storage container 106 from below.

The container supporting device hence comprises a base plate provided with side walls along the outer circumference or periphery of the base plate, thereby defining a compartment. The horizontal extent of the compartment is adapted to be large enough to receive one or more storage containers 106 and small enough to substantially hinder movements of the one or more storage containers 106 when inserted. However, in contrast to the exemplary configuration of the delivery vehicle 30 shown in FIGS. 3-6, the one or more side wall of the container supporting device has a vertical height less than the vertical height of each storage container 106. In fact, in order to achieve the purpose of the side walls of the container carrier 35 (to substantially prevent horizontal movement when inserted) it is sufficient with only a small vertical protrusion upwards from the base plate, for example less than 5% of the height of the side walls of the storage container 106.

Figure 8:
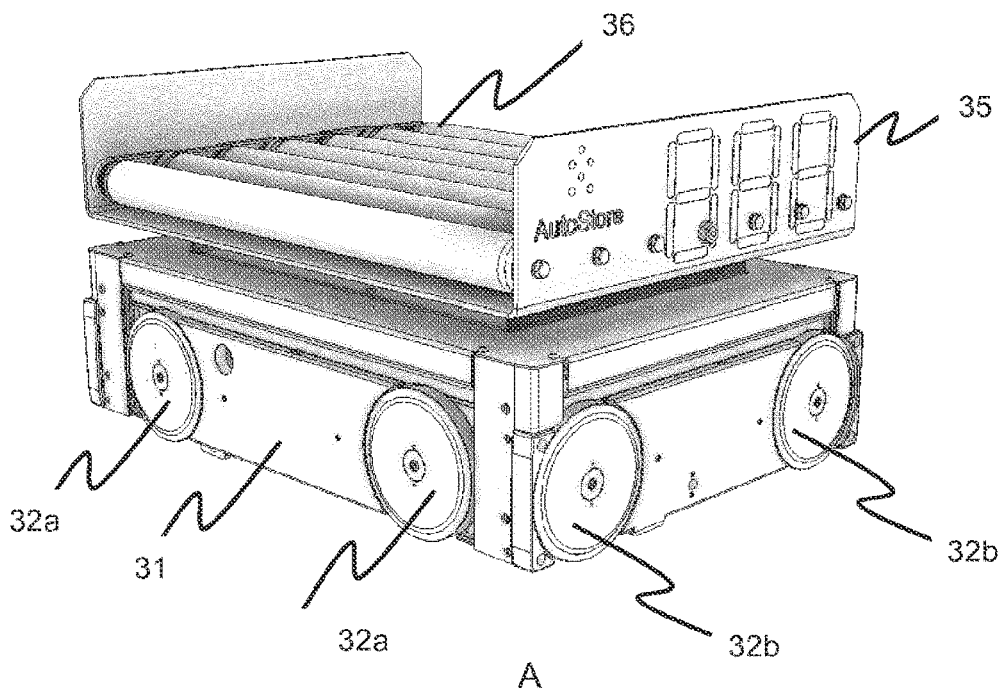
FIG. 8 A-B is a perspective view of another embodiment of the remotely operated delivery vehicle having a container carrier provided with conveyors.
Figure 8:
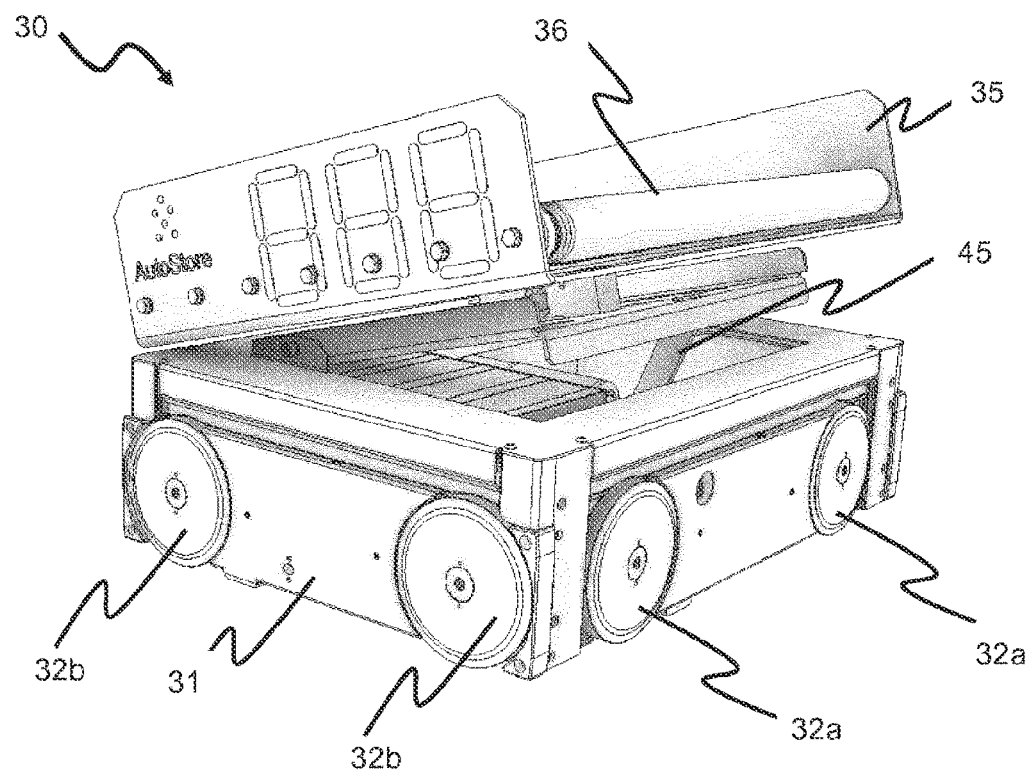

FIG. 8 A-B shows yet another exemplary configuration of the remotely operated delivery vehicle 30. In this configuration the container carrier 35 comprises a base plate, a conveyor 36 arranged on the base plate and two parallel side walls protruding upwards from the base plate. The rolling device 32 and the vehicle body 31 are equal or similar to the rolling device 32 and the vehicle body 31 described above in connection with FIGS. 3-7.

The conveyor may be set up by inter alia a plurality of parallel oriented rolls 36 having a common longitudinal direction perpendicular to the two side walls. In this way the rolls 36 allow one or more storage containers 106 to be shifted into or off the container carrier 35 while being guided by the side walls. The conveyor may be connected to a conveyor motor allowing rotation of one or more of the rolls.

Alternatively, the side walls are omitted, allowing the storage containers 106 to have a horizontal offset relative to a vertical center plane oriented perpendicular to the rolls longitudinal direction. Hence, the storage containers 106 may be arranged such that it extends beyond the end of the rolls in the rolls longitudinal direction.

In yet another alternative configuration, the conveyor may comprise a plurality of rolling balls within or on the base plate of the container carrier 35 allowing the one or more storage containers 106 to roll on top of the balls. With this configuration, and with no side walls present, the storage container 106 may be moved in any direction above the base plate.

Figure 9:
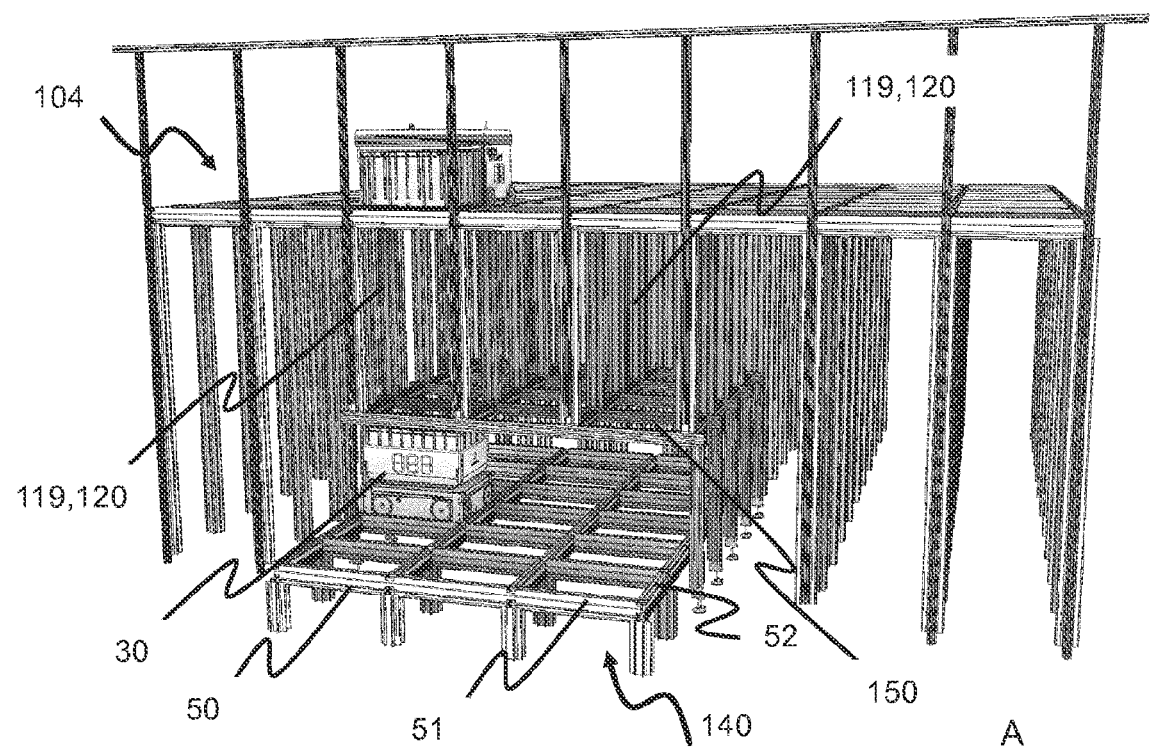
FIG. 9 A-B is a perspective view of an exemplary embodiment of an automated storage and retrieval grid and a delivery system according to the present invention.
Figure 9:
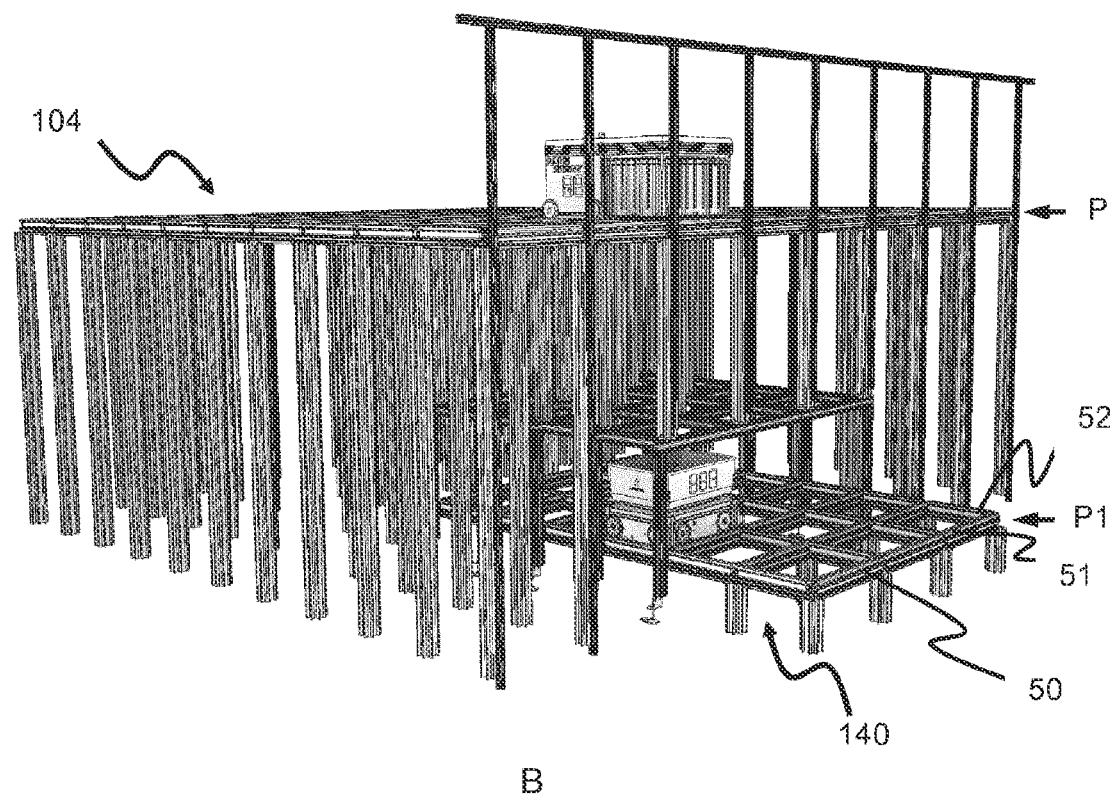

Perspective views of an automated storage and retrieval system are shown in FIGS. 9 A and B. The inventive system comprises storage grid 104 and a delivery system 140 including the above described delivery vehicle 30.

The storage grid 104 is equal or similar to the prior art storage grid 104 as described above, i.e. a storage grid 104 comprising a rail system 108; a plurality of stacks 107 of storage containers 106, a plurality of container handling vehicles 300 for lifting and moving storage containers 106 stacked in the stacks 107 and a delivery column 119,120 configured to receive a storage container 106 from a container handling vehicle 300.

The rail system 108 comprises a first set of parallel trails 110 arranged in a horizontal plane (P) and extending in a first direction (X) and a second set of parallel rails 111 arranged in the horizontal plane (P) and extending in a second direction (Y) which is orthogonal to the first direction (X). The first and second sets of rails 110, 111 form a grid pattern in the horizontal plane (P) comprising a plurality of adjacent grid cells 122. Each grid cell 122 displays a grid opening defined by a pair of neighboring rails of the first set of rails 110 and a pair of neighboring rails of the second set of rails 111.

The plurality of stacks 107 are arranged in storage columns 105 located beneath the rail system 108, wherein each storage column 105 is located vertically below a grid cell 122.

Each container handling vehicle 200,300 is configured to move on the rail system 108 above the storage columns 105.

Further, the delivery system 140 comprises one or more of the delivery vehicles 30 as described above, i.e. delivery vehicles 30 configured to receive and support one or more storage containers 106 for transport between one or more delivery columns 119,120 and one or more predetermined positions outside the storage grid 104. The predetermined positions may for example be a second location or a conveyor line or a transport vehicle such as a truck.

The delivery system 140 may further comprise a delivery rail system 50 situated below a delivery port 150 of the one or more delivery columns 119,120.

As shown in FIG. 9 A-B, the delivery rail system 50 may be constructed in the same way or a similar way as the rail system 108 for the container handling vehicles 200,300.

Hence, the delivery rail system 50 may comprise a first set of parallel rails 51 arranged in a horizontal plane (P1) and extending in a first direction (X), and a second set of parallel rails 52 arranged in the horizontal plane (P1) and extending in a second direction (Y) which is orthogonal to the first direction (X).

The delivery may also be a double rail system, as is shown in FIG. 2B, thus allowing a delivery vehicle 30 having a footprint generally corresponding to the lateral area defined by a delivery grid column to travel along a row of grid columns even if another delivery vehicle 30 is positioned above a grid column neighboring that row.

Both the single and double rail system, or a combination comprising a single and double rail arrangement in a single rail system, forms a grid pattern in the horizontal plane P1 comprising a plurality of rectangular and uniform grid locations or grid cells, where each grid cell comprises a grid opening being delimited by a pair of rails of the first rails and a pair of rails of the second set of rails.

The pair of rails in the X-direction defines parallel rows of delivery grid cells running in the X direction, and the pairs of rails in the Y direction defines parallel rows of delivery grid cells running in the Y direction.

Accordingly, each delivery grid cell has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the delivery grid cell.

The delivery rail system 50 can be fully or partly integrated into the storage grid 104. However, it is considered advantageous for ensuring an effective operation that the delivery rail system 50 has a horizontal extent that covers a delivery port 150 below at least one of the delivery columns 119,120.

FIGS. 9 A and B shows a delivery rail system 50 extending from a location inside the storage grid 104 to a location outside the storage grid 104. One or more second locations, i.e. a structure for picking and placing items in the storage containers 106, may be arranged somewhere at the periphery of the part of the delivery rail system 50 located outside the storage grid 104. Alternatively, or in addition, a conveyor may be arranged at or near the same periphery of the delivery rail system 50.

Figure 10:
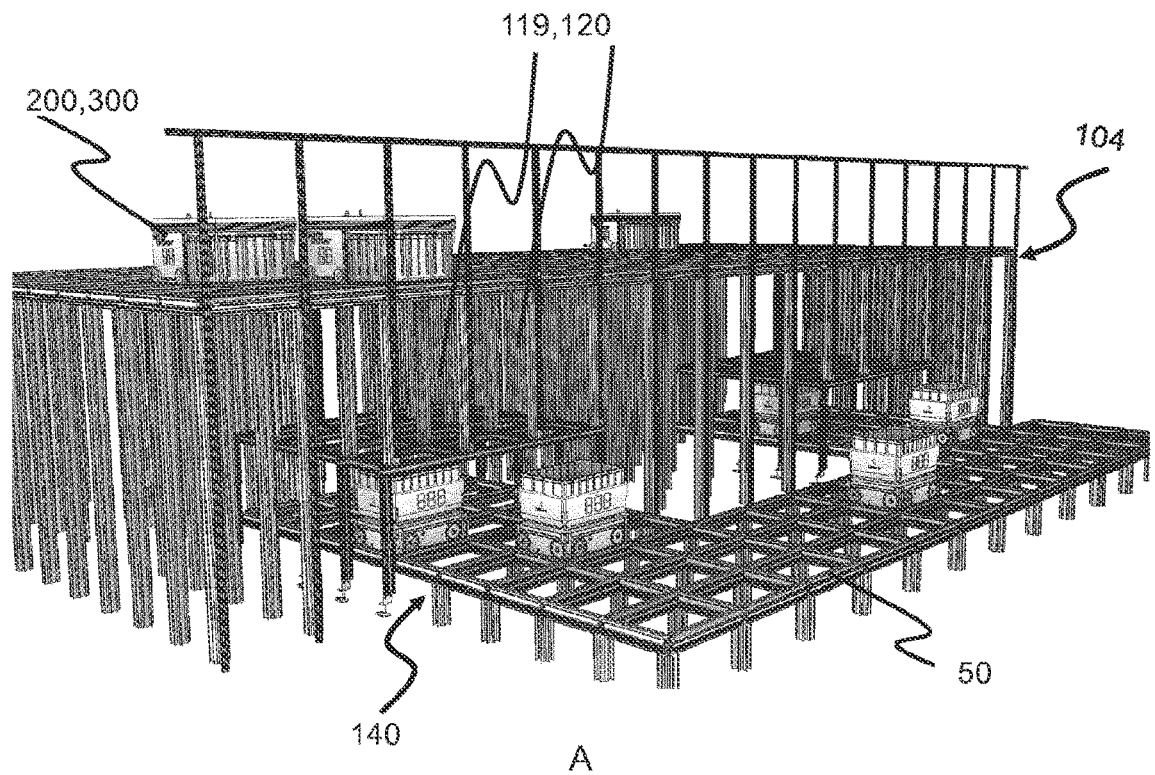
FIG. 10 A-B is a perspective view of another embodiment of an automated storage and retrieval grid and a delivery system according to the present invention.
Figure 10:
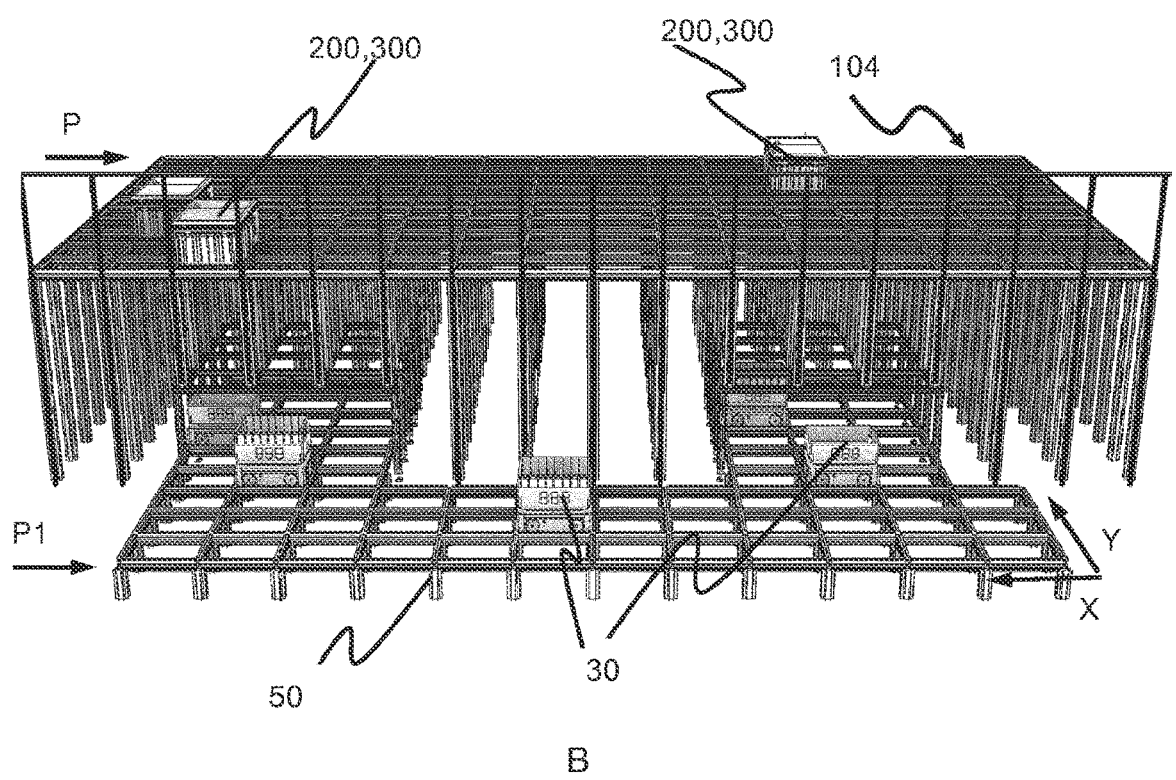

FIG. 10 A-B shows the inventive automated storage and retrieval system in a larger scale, where a plurality of delivery columns 119,120 with their respective delivery ports are arranged at different locations within the storage grid 104.

The delivery rail system 50 may be arranged such that it connects the plurality of delivery columns 119,120 provided at the different locations within the storage grid 104.

In the particular system shown in FIG. 10 the delivery rail system 50 may be divided into three interconnected zones, where a first zone is located within a first part of the storage grid 104, a second zone is located within a second part of the storage grid 104, and an intermediate zone is located outside the storage grid 104 and allows the delivery vehicles 30 to move from the first zone to the second zone. The first and second zones are divided by a plurality of storage columns 105.

Figure 11:
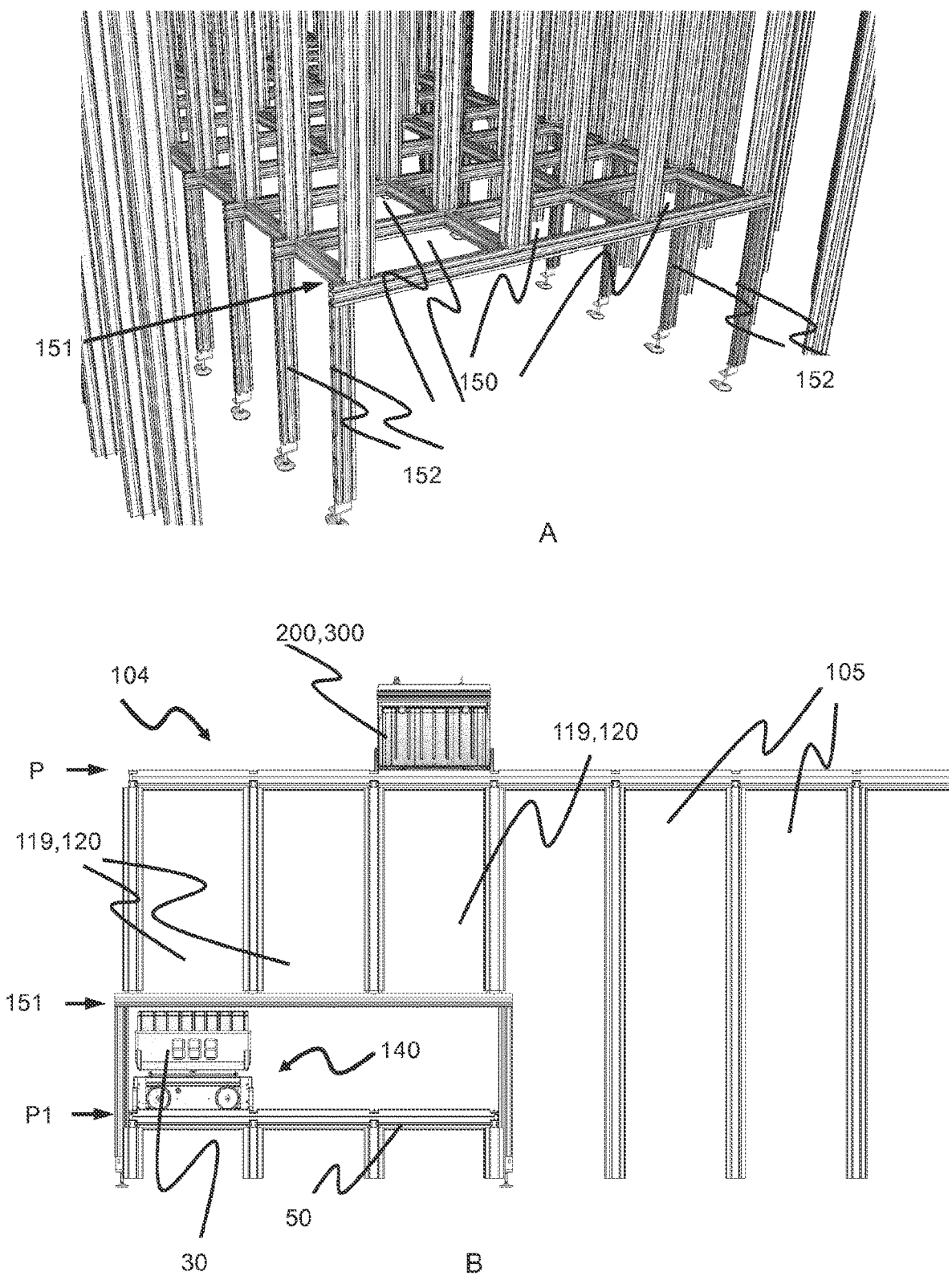
FIG. 11 A is a perspective view of another embodiment of an automated storage and retrieval grid with delivery columns and delivery port.

FIG. 11 A shows a plurality of delivery columns 119,120 of a storage grid 104. Each delivery column 119,120 is arranged with a delivery port 150 located at the lowermost level/end of the delivery column 119,120.

A side view of the automated storage and retrieval system 1 is shown in FIG. 11 B. The system 1 comprises an automated storage and retrieval grid 104 and a delivery system 140. The delivery system 140 comprises a delivery vehicle 30 adapted to move on a delivery rail system 50 located below a delivery port 150 of a delivery column 119,120 of a storage grid 104 (FIG. 11 A). A container handling vehicle 200,300 operates on a rail system 108 for pick-up and drop-off of storage containers through the delivery column 119,120. The delivery vehicle 30 is operated such that it can receive or deliver a storage container 106 to the delivery port 150. The container storage columns 105 are shown in the FIGS. 9-11 contain no storage containers 106. In operation, the storage columns 105 are filled, or almost filled, with storage containers 106 stacked one on top of another.

The delivery system may benefit from many of the considerations provided for the rail system 108 and the container handling vehicles 200,300 of the storage grid 104. As shown in FIGS. 10 and 11 the upright members 102 of the storage grid 104 are finished short and suspended on a mezzanine level 151 which itself has upright posts 152 that may be stepped out from the delivery columns 119,120, typically to a horizontal position located adjacent to the position of the vertical side walls of the rails 110,111 framing the corresponding grid cell 122. Consequently, the adoption of the delivery system 140 may result in a slight loss of storage space in the storage grid 104. However, the benefit is increased delivery efficacy of storage containers 106 in the automated storage and retrieval system 1 since the congestion of the storage containers 106 at the delivery columns 119,120 is avoided or at least reduced. The number of delivery columns 119,120 and the size of the mezzanine level 151 (its extent) in the X and Y direction may be customized according to the size of the storage system and the desired efficiency of the system.

Figure 12:
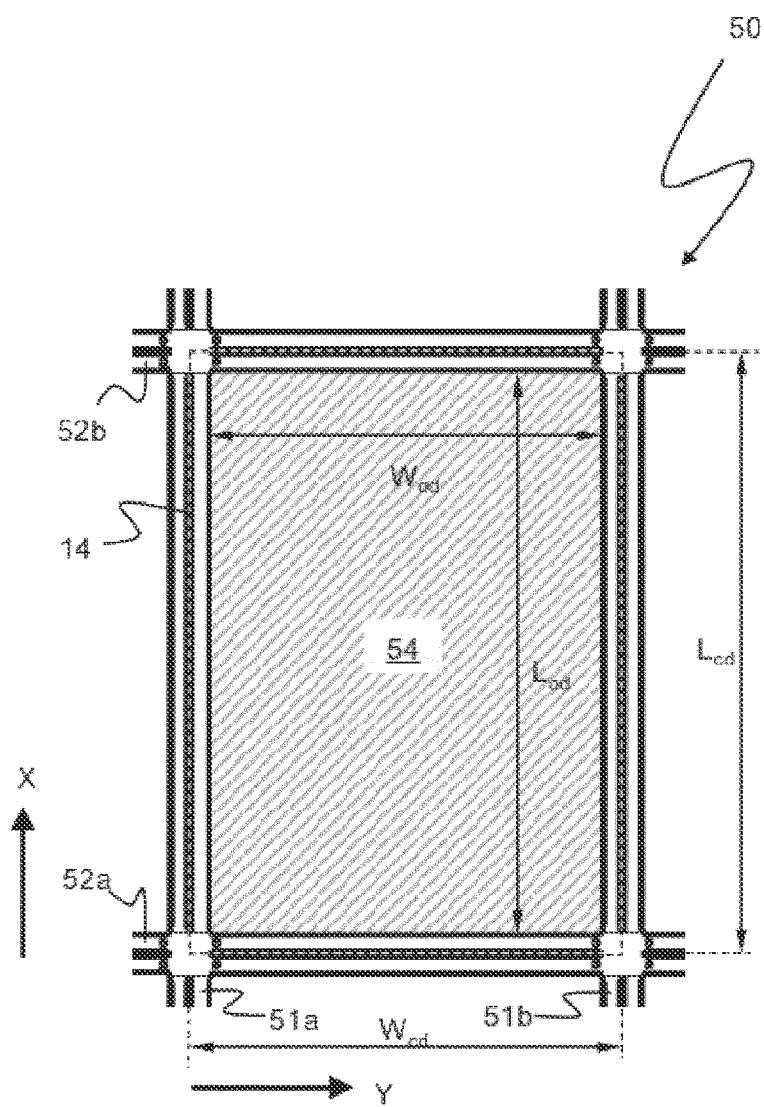
FIG. 12 is a top view of a double track delivery rail system of the automated storage and retrieval system according to FIG. 9-12.

FIG. 12 shows the delivery rail system 50 as a double track rail system, i.e. identical to the double track rail system of the container handling rail system 108 disclosed in FIG. 2C. As for the container handling rail system 108, each delivery vehicle grid cell 53 has a width $W_c$ which is typically within the interval of 30 to 150 cm, and a length $L_c$ which is typically within the interval of 50 to 200 cm. Each delivery vehicle grid opening 54 has a width $W_o$ and a length $L_o$ which is typically 2 to 10 cm less than the width $W_c$ and the length $L_c$ of the grid cell 53.

In the X and Y directions, neighboring delivery vehicle grid cells 53 are arranged in contact with each other such that there is no space there-between.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

REFERENCE NUMERALS

30 Delivery vehicle
31 Vehicle body
32 Rolling device
32*a* First set of wheels
32*b* Second set of wheels
35 Container carrier
36 Rolls
37,37' Delivery vehicle footprint
41 Displacement device
42 Tilt motor
43 Power source
44 Controller
45 Lifting arm
46 Support element
47 Actuator lever
50 Delivery rail system
51 First set of parallel rails
51*a* First neighboring rail of first set
51*b* Second neighboring rail of first set
52 Second set of parallel rails
52*a* First neighboring rail of second set
52*b* Second neighboring rail of second set
53 Delivery vehicle grid cell
54 Delivery vehicle grid opening
P1 Horizontal plane of delivery rail system
100 Framework structure
102 Upright members of framework structure
103 Horizontal members of framework structure
104 Storage grid/three-dimensional grid
105 Storage column
106 Storage container
107 Stack
108 Rail system/Container handling vehicle rail system
110 First set of parallel rails in first direction (X)
110*a* First neighboring rail of first set
110*b* Second neighboring rail of first set
111 Second set of parallel rails in second direction (Y)
111*a* First neighboring rail of second set
111*b* Second neighboring rail of second set
115 Grid opening/Container handling vehicle grid opening
119 Delivery column
120 Delivery column
122 Grid cell/Container handling vehicle grid cell
140 Delivery system
150 Delivery port
151 Mezzanine level
152 Upright post
200 First container handling vehicle
201 Wheel arrangement
202,202' Container handling vehicle footprint
300 Second container handling vehicle
301 Wheel arrangement
X First direction
Y Second direction
P Horizontal plane of rail system
Wo Width of container handling vehicle grid opening
Wc Width of container handling vehicle grid cell
Lo Length of container handling vehicle grid opening
Lc Length of container handling vehicle grid cell
Wod Width of delivery vehicle grid opening
Wcd Width of delivery vehicle grid cell
Lod Length of delivery vehicle grid opening
Lcd Length of delivery vehicle grid cell

The invention claimed is:
1. An automated storage and retrieval system comprising:
an automated storage and retrieval grid, wherein the automated storage and retrieval grid comprises:
a container handling vehicle rail system for guiding a plurality of container handling vehicles, the container handling vehicle rail system comprising a first set of parallel rails arranged in a horizontal plane (P)

and extending in a first direction (X), and a second set of parallel rails arranged in the horizontal plane (P) and extending in a second direction (Y) which is orthogonal to the first direction (X), which first and second sets of rails form a grid pattern in the horizontal plane (P) comprising a plurality of adjacent container handling vehicle grid cells, each container handling vehicle grid cell comprising a container handling vehicle grid opening defined by a pair of neighboring rails of the first set of rails and a pair of neighboring rails of the second set of rails;

a container handling vehicle operating on the container handling vehicle rail system; and a delivery column adapted for transport of a storage container arranged in a stack of storage containers beneath the container handling vehicle rail system between a container handling vehicle and a delivery port situated at a lower end of the delivery column; and a delivery system, wherein the delivery system comprises:
a delivery rail system on which a remotely operated delivery vehicle operates, said delivery system being situated below the delivery port, wherein the delivery rail system comprises a first set of parallel rails arranged in a horizontal plane (P1) and extending in a first direction (X), and a second set of parallel rails arranged in the horizontal plane (P1) and extending in a second direction (Y) which is orthogonal to the first direction (X), which first and second sets of rails form a grid pattern in the horizontal plane comprising a plurality of adjacent delivery vehicle grid cells, each delivery vehicle grid cell comprising a delivery vehicle grid opening defined by a pair of neighboring rails of the first set of rails and a pair of neighboring rails of the second set of rails, wherein the remotely operated delivery vehicle comprising a container carrier adapted to support the storage container, the remotely operated delivery vehicle being further adapted to transport the storage container between the delivery port and a second location for handling of the storage container by at least one of a robotic operator and a human operator, wherein each delivery vehicle grid cell of the delivery rail system has a size which is equal a size of the container handling vehicle grid cell of the container handling vehicle rail system, and wherein the delivery rail system is below a lower level of the automated storage and retrieval grid, and the deliver rail system extends from a location inside the automated storage and retrieval grid to a location outside the automated storage and retrieval grid such that the second location for handling of the storage container is arranged at a periphery of the deliver rail system at the location outside the automated storage and retrieval grid.

2. The automated storage and retrieval system according to claim 1, wherein the remotely operated delivery vehicle further comprises rolling devices connected to a vehicle body arranged below the container carrier.

3. The automated storage and retrieval system according to claim 1, wherein the remotely operated delivery vehicle has a delivery vehicle footprint with a horizontal extent which is equal to or less than the horizontal extent of the delivery vehicle grid cell.

4. The automated storage and retrieval system according to claim 1, wherein at least one of the plurality of delivery vehicle grid cells of the delivery rail system is arranged directly below a container handling vehicle grid cell of the container handling vehicle rail system.

5. The automated storage and retrieval system according to claim 1, wherein each of the first and second set of rails of the delivery rail system is a double track rail comprising two parallel tracks separated by a protrusion running midway.

6. The automated storage and retrieval system according to claim 1, wherein each of the first and second set of rails of the container handling vehicle rail system is a double track rail comprising two parallel tracks separated by a protrusion running midway.

7. The automated storage and retrieval system according to claim 1, wherein the delivery rail system extends from a location below the delivery port and to the second location.

8. The automated storage and retrieval system according to claim 1, wherein the automated storage and retrieval grid comprises upright members which are finished short and suspended on a mezzanine level which itself has upright posts that are stepped out from the delivery column.

* * * * *